(12) United States Patent
Liu et al.

(10) Patent No.: US 11,703,590 B2
(45) Date of Patent: Jul. 18, 2023

(54) LIDAR SIGNAL RECEIVING CIRCUITS, LIDAR SIGNAL GAIN CONTROL METHODS, AND LIDARS USING THE SAME

(71) Applicant: SUTENG INNOVATION TECHNOLOGY CO., LTD., Shenzhen (CN)

(72) Inventors: Letian Liu, Shenzhen (CN); Shen Jiang, Shenzhen (CN); Chunxin Qiu, Shenzhen (CN)

( * ) Notice: Subject to any disclaimer, the term of this patent is extended or adjusted under 35 U.S.C. 154(b) by 0 days.

(21) Appl. No.: 16/758,848

(22) PCT Filed: Nov. 18, 2019

(86) PCT No.: PCT/CN2019/119263
§ 371 (c)(1),
(2) Date: Apr. 23, 2020

(87) PCT Pub. No.: WO2020/103805
PCT Pub. Date: May 28, 2020

(65) Prior Publication Data
US 2021/0270965 A1    Sep. 2, 2021

(30) Foreign Application Priority Data

Nov. 19, 2018   (CN) .......................... 201811376619.7
Sep. 5, 2019    (WO) ................ PCT/CN2019/104530

(51) Int. Cl.
*G01S 7/481*    (2006.01)
*G01S 17/08*    (2006.01)

(52) U.S. Cl.
CPC ............ *G01S 17/08* (2013.01); *G01S 7/4814* (2013.01); *G01S 7/4816* (2013.01)

(58) Field of Classification Search
CPC . G02B 26/101; G02B 26/0816; G01S 7/4817; G01S 17/42; G01S 17/08;
(Continued)

(56) References Cited

U.S. PATENT DOCUMENTS

| 5,487,669 A | 1/1996 | Kelk |
| 7,486,386 B1 * | 2/2009 | Holcombe .............. G01S 17/04 356/5.1 |

(Continued)

FOREIGN PATENT DOCUMENTS

| CN | 203688801 U | 7/2014 |
| CN | 104508977 A | 4/2015 |

(Continued)

OTHER PUBLICATIONS

International Search Report.
(Continued)

*Primary Examiner* — Tsion B Owens
(74) *Attorney, Agent, or Firm* — Bayes PLLC

(57) ABSTRACT

The present application relates to a Lidar that includes a laser transmitter to emit a laser beam; an optical processing circuit. The optical processing circuit is configured to receive the laser beam reflected from a target object and convert the reflected laser beam to a photocurrent signal, and convert the photocurrent signal from an optical receiver to a voltage signal. The Lidar also includes a gain control circuit, connecting to the optical processing circuit; and a controller, connecting to the gain control circuit, to adjust a gain of the optical processing circuit via the gain control circuit and based on an amplitude of the voltage signal.

20 Claims, 11 Drawing Sheets

(58) Field of Classification Search
CPC .... G01S 7/4814; G01S 7/4811; G01S 7/4816; G01S 7/489; G01S 17/10; G01S 7/4861
See application file for complete search history.

(56) References Cited

U.S. PATENT DOCUMENTS

| | | | | |
|---|---|---|---|---|
| 8,358,938 | B2* | 1/2013 | Tanaka | H04B 10/07955 398/202 |
| 9,653,001 | B2* | 5/2017 | Mughal | G09B 19/167 |
| 10,198,639 | B2* | 2/2019 | Sung | B60R 1/00 |
| 10,281,721 | B2* | 5/2019 | Bhalla | B60W 40/09 |
| 10,816,649 | B1* | 10/2020 | Keyser | G01J 4/02 |
| 10,924,679 | B2* | 2/2021 | Lee | G06V 20/597 |
| 11,175,388 | B1* | 11/2021 | Wood | G01S 17/34 |
| 11,228,370 | B2* | 1/2022 | Danesh | H04B 10/112 |
| 2002/0074409 | A1 | 6/2002 | Chang | |
| 2002/0131034 | A1 | 9/2002 | Chien et al. | |
| 2011/0066399 | A1* | 3/2011 | Mahajan | G01C 3/08 356/3.01 |
| 2012/0105825 | A1* | 5/2012 | Gogol | G01C 15/002 356/8 |
| 2012/0215403 | A1* | 8/2012 | Tengler | B60K 35/00 701/36 |
| 2014/0292828 | A1* | 10/2014 | Yasumoto | B60K 37/02 345/204 |
| 2015/0010207 | A1* | 1/2015 | Inada | G06F 3/012 382/103 |
| 2015/0098075 | A1* | 4/2015 | Bestler | G01S 7/4817 356/3.01 |
| 2015/0235398 | A1* | 8/2015 | Kim | G06T 11/60 345/633 |
| 2016/0163108 | A1* | 6/2016 | Kim | G02B 27/0179 345/633 |
| 2016/0164624 | A1 | 6/2016 | Yamauchi | |
| 2016/0231419 | A1 | 8/2016 | Gusev | |
| 2017/0168160 | A1* | 6/2017 | Metzler | G01S 17/86 |
| 2017/0187963 | A1* | 6/2017 | Lee | G06V 20/56 |
| 2017/0269684 | A1* | 9/2017 | Murai | B60R 1/00 |
| 2018/0037116 | A1* | 2/2018 | Avery | B60K 35/00 |
| 2018/0239136 | A1* | 8/2018 | Ishikawa | G06F 3/013 |
| 2020/0169747 | A1* | 5/2020 | Jeong | H04N 19/176 |
| 2020/0389232 | A1* | 12/2020 | Danesh | H04B 10/1123 |

FOREIGN PATENT DOCUMENTS

| | | |
|---|---|---|
| CN | 104737446 A | 6/2015 |
| CN | 104823072 A | 8/2015 |
| CN | 106772437 A | 5/2017 |
| CN | 107632307 A | 1/2018 |
| CN | 108614272 A | 10/2018 |
| CN | 108663672 A | 10/2018 |
| CN | 110196430 A | 9/2019 |

OTHER PUBLICATIONS

First Office Action issued in related Chinese Application No. 201811376619.7, dated Jul. 26, 2021, 10 pages.
Second Office Action issued in related Chinese Application No. 201811376619.7, dated Dec. 31, 2021, 6 pages.
Third Office Action issued in related Chinese Application No. 201811376619.7, dated Jun. 1, 2022, 7 pages.
Fourth Office Action issued in related Chinese Application No. 201811376619.7, dated Sep. 23, 2022, 5 pages.
Extended European Search Report issued in related European application No. 19886421.7, dated Jun. 24, 2022.
Search Report issued in corresponding International Application No. PCT/CN2019/104530, dated Apr. 26, 2020, 10 pages.
Zhang et al. "Design of the Receiver Circuit in Pulsed Lased Rang Finding", Electronic Sci & Tech. Apr. 15, 2010, pp. 30-32.
First Office Action issued in related Chinese Application No. 201980050274.2, dated Apr. 21, 2023, 9 pages.

* cited by examiner

LIDAR SIGNAL RECEIVING CIRCUITS, LIDAR SIGNAL GAIN CONTROL METHODS, AND LIDARS USING THE SAME

RELATED APPLICATIONS

The present patent document claims the benefit of priority to a Chinese Patent Application No. 201811376619.7, filed Nov. 19, 2018, and entitled "Lidar Ranging System," and a PCT Patent Application No. PCT/CN2019/104530, filed Sep. 5, 2019, and entitled "Lidar signal receiving circuit and Lidar," the entire contents of each of which are incorporated herein by reference.

BACKGROUND

1. Technical Field Text

The present application relates to the field of Lidar technology. Specifically, the present application relates to Lidar signal receiving circuits, Lidar signal gain control methods, and Lidars using the same.

2. Background Information

Lidar is an optical radar system that emits a laser beam to detect features, such as position, speed, and the like, of a target object. The Lidar uses a laser as a signal source to emit pulsed laser beams to the target object such as trees, roads, bridges, and buildings. The pulsed laser beams incident to the target object and scatter. Some of the scattered laser beams are reflected to the Lidar's receiver. Based on to the optical signal reflected by the target object, the Lidar can obtain related information of the target object, such as the distance, direction, height, speed, and shape of the target object.

Due to its advantages of high resolution and small interference from environments, the Lidar has important applications in fields such as autonomous driving and robots. The Lidar can also be used for ranging the target object, as well as detecting reflection information, such as the reflectivity, of the target object.

Currently, the Lidar ranging is mainly obtained by measuring the flight time of the laser beam between the target object and the Lidar, and then determining the distance according to the flight time and the speed of light. High-power lasers can be used to increase the intensity of reflected optical signals for ranging long-distance target objects.

However, because traditional Lidars usually adopt lasers uses with fixed power, when detecting a close-range target object, the received optical signal may be overly powerful that the signal output from the Lidar's receiver is saturate. Whereas because the farther the distance is, the weaker the reflected optical signal, when the measuring distance exceeds certain range, the reflected optical signal may become too weak, so that it is overwhelmed by the noise of the receiver. Therefore, the traditional Lidar is difficult to accurately measure long-distance optical signals, and its ranging distance is limited.

Meanwhile, because different objects may have different reflectivity to the laser beam and may be of different distance from the Lidar, the energy of the reflected optical signal may fluctuate in a very high dynamic range between nW and mW. Therefore, after the reflected optical signal is converted into an electrical signal and amplified by the Lidar, the electrical signal is often saturated, or under-compensated. In this scenario, output signal distortion is prone to occur because the Lidar operates in a non-linear region. This distortion can lead to many problems such as inaccuracy of the measured distance and reflection information.

BRIEF SUMMARY

Based on this, it is necessary to provide Lidar signal receiving circuits, the Lidar signal gain control methods, and Lidars adopting the signal receiving circuits and signal gain control methods to solve the problems of inaccurate ranging and measurement of reflection information.

An aspect of the present application relates to an optical signal processing circuit for Lidar. The optical processing circuit includes, an optical processing circuit, to convert a photocurrent signal from an optical receiver to a voltage signal; a gain control circuit, connecting to the optical processing circuit; and a controller, connecting to the gain control circuit, to adjust a gain of the optical processing circuit via, the gain control circuit and based on an amplitude of the voltage signal.

According to some embodiments, the optical processing circuit includes an amplification circuit to amplify the photocurrent signal to the voltage signal.

According to some embodiments, to adjust the gain of the optical processing circuit, the controller determines a target gain of the amplification circuit so that the amplitude of the voltage signal remains substantially stable regardless of an amplitude of the photocurrent signal.

According to some embodiments, the optical receiver is a laser receiver of a Lidar, and the photocurrent is generated by the laser receiver from a laser beam transmitted by the Lidar and reflected from a target object, and to adjust the gain of the optical processing circuit, the controller: determines a distance between the target object and the laser receiver, and determines the target gain of the amplification circuit according to the ranging distance to compensate a change of the photocurrent signal due to a change of the distance.

According to some embodiments, the controller includes a digital processing circuit, and to adjust the gain of the optical processing circuit, the digital processing circuit: determines that the voltage signal is saturated, generate a control signal, and send the control signal to the gain control circuit to decrease the gain of the optical signal processing circuit.

According to some embodiments, the controller includes a digital processing circuit, and to adjust the gain of the optical processing circuit, the digital processing circuit: determines that the voltage signal is under-compensated, generate a control signal, and send the control signal to the gain control circuit to increase the gain of the optical signal processing circuit.

According to some embodiments, the optical processing circuit includes an optical sensor of the optical receiver to convert an optical signal to the photocurrent signal, and the gain control circuit is configured to adjust a bias voltage of the optical sensor.

According to some embodiments, the amplification circuit includes a transimpedance amplifier, and the gain control circuit is a resistance-control circuit configured to adjust a resistance of a feedback resistor of the amplification circuit.

According to some embodiments, the amplification circuit includes a transimpedance amplifier (TIA), which includes a plurality of candidate TIA resistors, and the gain control circuit includes a switch connecting to the plurality of candidate TIA resistors and configured to switching between the plurality of candidate TIA resistors to select a target resistor from the plurality of candidate TIA resistors.

According to some embodiments, the optical processing circuit further includes a secondary amplification circuit other than the amplification circuit, and the gain control circuit further connects to the secondary amplification circuit to adjust a gain of the secondary amplification circuit.

Another aspect of the present application relates to the present application relates to a Lidar that includes a laser transmitter to emit a laser beam; an optical processing circuit. The optical processing circuit is configured to receive the laser beam reflected from a target object and convert the reflected laser beam to a photocurrent signal, and convert the photocurrent signal from an optical receiver to a voltage signal. The Lidar also includes a gain control circuit, connecting to the optical processing circuit; and a controller, connecting to the gain control circuit, to adjust a gain of the optical processing circuit via the gain control circuit and, based on an amplitude of the voltage signal.

According to some embodiments, the optical processing circuit includes an amplification circuit to amplify the photocurrent signal to the voltage signal.

According to some embodiments, to adjust the gain of the optical processing circuit, the controller determines a target gain of the amplification circuit so that the amplitude of the voltage signal remains substantially stable regardless of an amplitude of the photocurrent signal.

According to some embodiments, to adjust the gain of the optical processing circuit, the controller: determines a distance between the target object and the laser receiver, and determines the target gain of the amplification circuit according to the ranging distance to compensate a change of the photocurrent signal due to a change of the distance.

According to some embodiments, the controller includes a digital processing circuit, and to adjust the gain of the optical processing circuit, the digital processing circuit: determines that the voltage signal is saturated, generate a control signal, and send the control signal to the gain control circuit to decrease the gain of the optical signal processing circuit.

According to some embodiments, the controller includes a digital processing circuit, and to adjust the gain of the optical processing circuit, the digital processing circuit: determines that the voltage signal is under-compensated, generate a control signal, and send the control signal to the gain control circuit to increase the gain of the optical signal processing circuit.

According to some embodiments, the optical processing circuit includes an optical sensor of the optical receiver to convert an optical signal to the photocurrent signal, and the gain, control circuit is configured to adjust a bias voltage of the optical sensor.

According to some embodiments, the amplification circuit includes a transimpedance amplifier, and the gain control circuit is a resistance-control circuit configured to adjust a resistance of a feedback resistor of the amplification circuit.

According to some embodiments, the amplification circuit includes a transimpedance amplifier (TIA), which includes a plurality of candidate TIA resistors, and the gain control circuit includes a switch connecting to the plurality of candidate TIA resistors and configured to switching between the plurality of candidate TIA resistors to select a target resistor from the plurality of candidate TIA resistors.

According to some embodiments, the optical processing circuit further includes a secondary amplification circuit other than the amplification circuit, and the gain control circuit further connects to the secondary amplification circuit to adjust a gain of the secondary amplification circuit.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION OF TH E DRAWINGS

Figure 1:
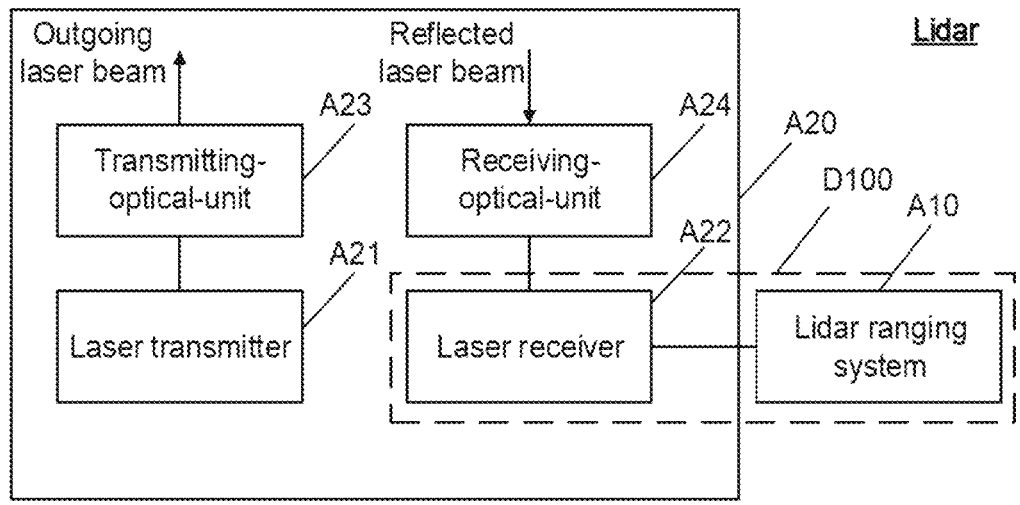
FIG. 1 is an implementation scheme of a Lidar according to embodiments of the present application.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may or may not be implemented in order. Conversely, the operations may be implemented in inverted order, or simultaneously. Moreover, one or more other operations may be added to the flowcharts, One or more operations may be removed from the flowcharts.

Moreover, while the system and method in the present disclosure is described primarily in regard to unmanned moving platforms, it should also be understood that this is only one exemplary embodiment. The system or method of the present disclosure may be applied to any other kind of moving platforms.

FIG. 1 is an implementation scheme of a Lidar in accordance with some of the embodiments of the present application. The Lidar may include a laser transmitting and receiving portion A20 and a Lidar ranging system A10. The laser transmitting and receiving portion A20 may include a laser transmitter A21, a laser receiver A22 (which may include an optical sensor), a transmitting-optical-unit A23 and a receiving-optical-unit A24. The Lidar ranging system A10 may be connected to the laser receiver A22. The laser receiver A22 and the Lidar ranging system may form part of a Lidar signal receiving circuit D100.

The transmitting-optical-unit A23 and the receiving-optical-unit A24 may be a lens or a lens group. The laser receiver A22 may be any one of a diode, a diode array, a silicon photomultiplier, and a silicon photomultiplier array. The diode may be an indium phosphide photodiode, or an avalanche breakdown photodiode. For example, the diode array, silicon photomultiplier array may be a regular array, wherein the spacing of two adjacent diodes or silicon photomultipliers may be a fixed value of 0.2 mm or 0.5 mm. Alternatively, the diode array and/or silicon photomultiplier array may be a circular array or an array with other profile shapes.

Specifically, the laser transmitter A21 may be used to emit an outgoing laser; the transmitting-optical-unit A23 may be used to collimate the outgoing laser; the receiving-optical-unit A24 may be used to focus the reflected laser; and the laser receiver A22 may be used to receive the reflected laser beam and convert the reflected laser beam to a photocurrent signal, wherein the reflected laser beam is a laser beam from which the outgoing laser light is reflected.

Figure 2:
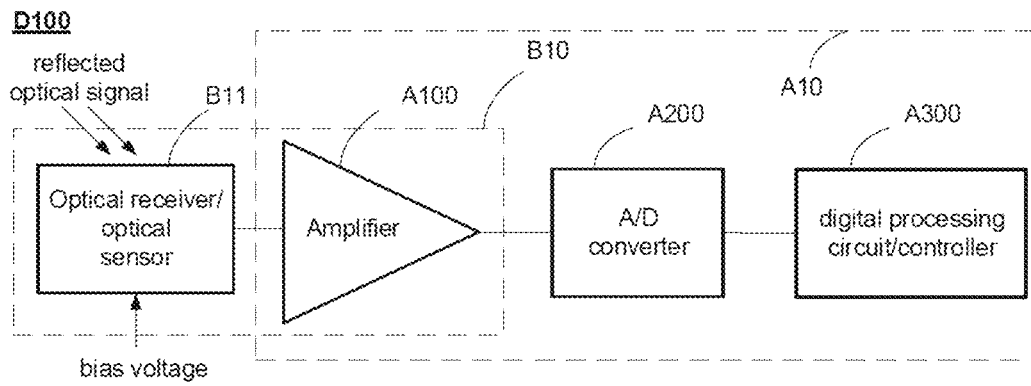
FIG. 2 is a schematic diagram of the Lidar signal receiving circuit according to embodiments of the present application.

FIG. 2 is a schematic diagram of the Lidar signal receiving circuit D100 in FIG. 1, according to embodiments of the present application. As described above, the Lidar signal receiving circuit D100 may include part of the Laser receiver A22 and the Lidar ranging system A10. Specifically, the Lidar signal receiving circuit D100 may include an optical sensor B11, an amplifier A100, a converter A200, and a controller A300. The optical sensor B11 may be part of the laser receiver A22 in FIG. 1. The optical sensor B1 and the amplifier A100 may form an optical signal processing circuit B10. The amplifier A100 may be a transimpedance amplifier (TIA); the converter A200 may include an analog to digital converter (A/D converter), and the controller A300 may include a digital processing circuit.

The optical sensor may receive the reflected optical signal from the target object, and then send an electrical signal corresponding to the reflected optical signal to the amplifier A100 for amplification processing. The processed electrical signal, which may be an analog voltage signal, may then be input into the A/D converter A200. The A/D converter A200 may convert the processed analog voltage signal into a digital voltage signal, and then input the digital voltage signal to the controller A300, which may be a digital processing circuit.

Figure 3A:
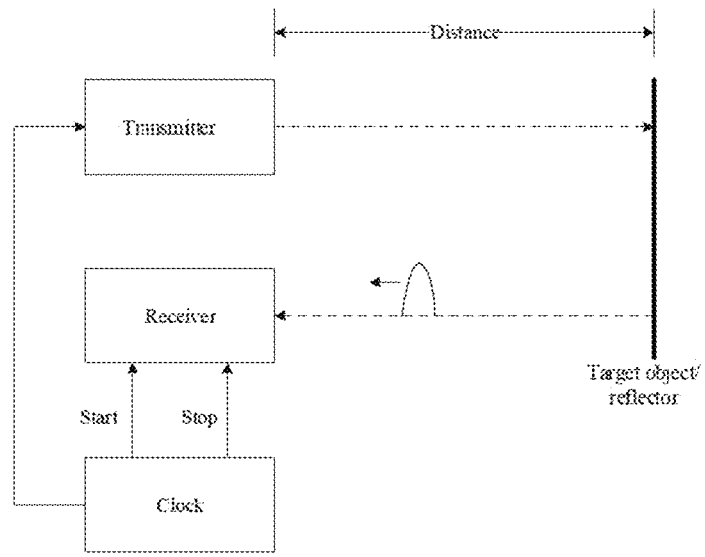
FIG. 3A is a schematic diagram of ranging operations of the above-mentioned Lidar according to embodiments of the present application.
Figure 3B:
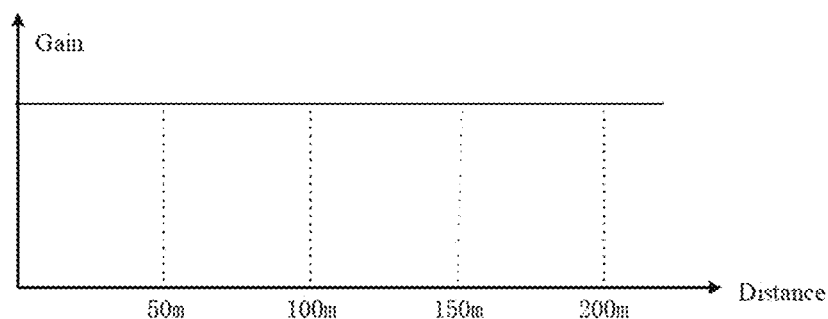
FIG. 3B is a schematic distance-gain diagram of the above-mentioned Lidar during ranging according to embodiments of the present application.
Figure 3C:
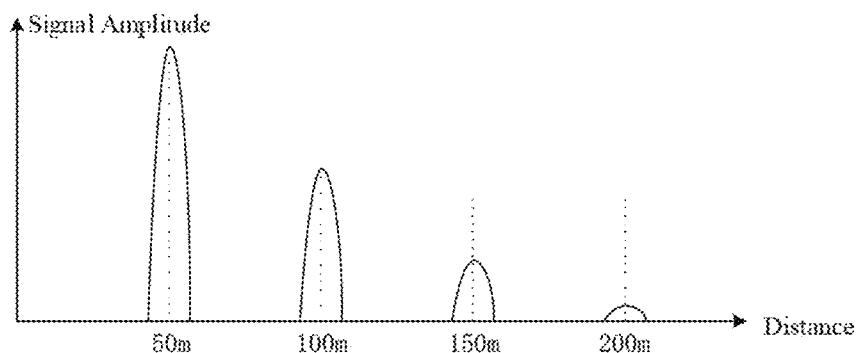
FIG. 3C is a schematic distance-signal amplitude diagram of the above-mentioned Lidar during the ranging.

FIG. 3A is a schematic diagram of ranging operations of the above-mentioned Lidar. FIG. 3B is a schematic distance-gain diagram of the above-mentioned Lidar during ranging, and FIG. 3C is a schematic distance-signal amplitude diagram of the above-mentioned Lidar during the ranging. As shown in FIG. 3A, the laser transmitter A21 of the Lidar may emit an outgoing laser beam to a target object/reflector. The outgoing laser beam may incident to the target object/reflector, be scattered by the target object/reflector, and then a portion of the outgoing laser beam (i.e., the reflected laser beam) may be reflected back to the laser receiver A22. The Lidar uses a clock to measure the time of flight of the laser beam between the target object/reflector and the receiver of the Lidar, and obtain the distance between the target object/reflector and the receiver according to the flight time and the speed of light.

Within the Lidar detection range, the power of the reflected optical signal (i.e., the reflected laser beam) may fluctuate in a very high dynamic range between nW and mW. Accordingly, when the optical sensor is operating under a constant bias-voltage control circuit, the photocurrent signal output by the optical sensor may fluctuate between uA and mA levels which requires the post-stage devices, such as the TIA circuit and the A/D converter in the signal receiving circuit D100 have very high dynamic range, But the post-stage devices cannot meet this requirement due to the consideration of cost and supply. In this scenario, one way out is to reduce the system dynamic range of the entire Lidar signal receiving circuit.

Figure 3D:
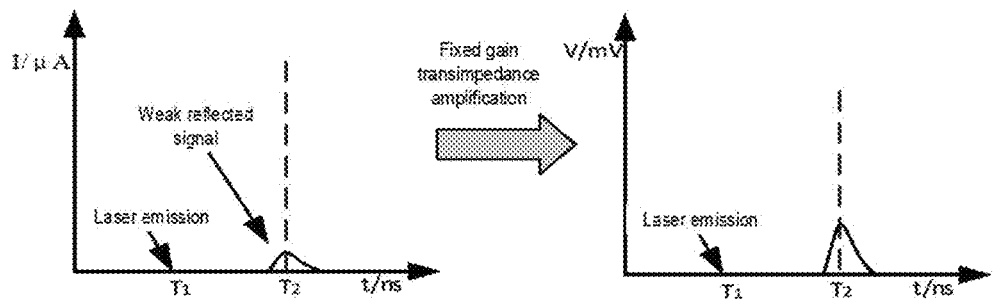
FIG. 3D is a schematic time-amplitude diagram of the above-mentioned Lidar with a fixed system gain.

Generally, the system gain of the entire radar lidar signal receiving circuit may be set to a fixed value. In FIG. 3B, the horizontal axis indicates the distance between the target object reflector and the laser receiver A22, and the vertical axis indicates the gain of the Lidar. As can be seen, the gain remains constant with respect to the distance. FIG. 3C shows the signal amplitude of the reflected laser beam with respect to the distance. The horizontal axis indicates the distance between the target object reflector and the laser receiver A22, and the vertical axis indicates the signal amplitude. As can be seen, the larger the distance, the smaller the signal amplitude. This phenomenon at least leads two problems:

On the one hand, as shown in FIG. 3D, when the system gain of the entire Lidar signal receiving circuit D100 is a certain fixed value, the system gain can ensure that even when the reflected optical signal is weak (such as when the photocurrent signal of the optical sensor is μA level), the reflected optical signal can still be detected by the digital processing circuit after being amplified by the gain. However, when the target object/reflector is too far so that the reflected optical signal is too weak to be distinguishable from system noise signal, the reflected optical signal may become undetectable by the digital processing circuit even after being amplified with the gain, i.e. that is the occurrence of under-compensation. Consequently, the ranging distance of the Lidar may become too short and the sensitivity of the Lidar may be too low.

Figure 3E:
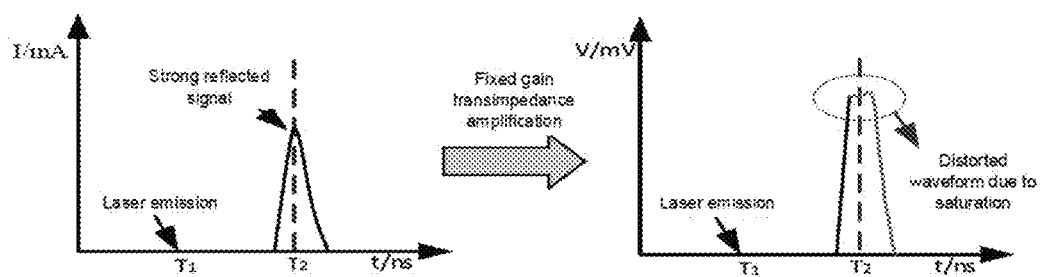
FIG. 3E is a schematic time-amplitude diagram of the above-mentioned Lidar of the fixed system gain showing the occurrence of saturation when the reflected optical signal is strong.

Second, as shown in FIG. 3E, when the reflected optical signal is strong (such as when the photocurrent signal of the optical sensor is in mA level), signal saturation may occur after the reflected optical is amplified with the gain, resulting in waveform distortion due to a nonlinear amplification, which directly leads to inaccurate measurement of the signal reception time T2 (generally the signal peak time). This will lead to ranging problems such as inaccurate measurement of distance and reflection information.

To solve the above technical problems, the following embodiments will be described with reference to the accompanying drawings to illustrate technical solutions provided in the present application and how the technical solutions solve the above-mentioned technical problems. The embodiments may be combined with each other, and same or similar concepts or processes may not be described in, some embodiments.

In order to solve the technical problem that the detected optical signal is flooded by the noise when the measuring distance exceeds a certain distance, thereby limiting the ranging distance, the present application provides a Lidar ranging system in the Lidar signal receiving circuit. The Lidar ranging system may include a variable-gain amplifier and improve the Lidar signal detection by adjusting the gain value of the variable-gain amplifier under a premise that the laser emission power of the current Lidar is constant, thereby increasing the dynamic range of the Lidar detection signals.

Figure 4:
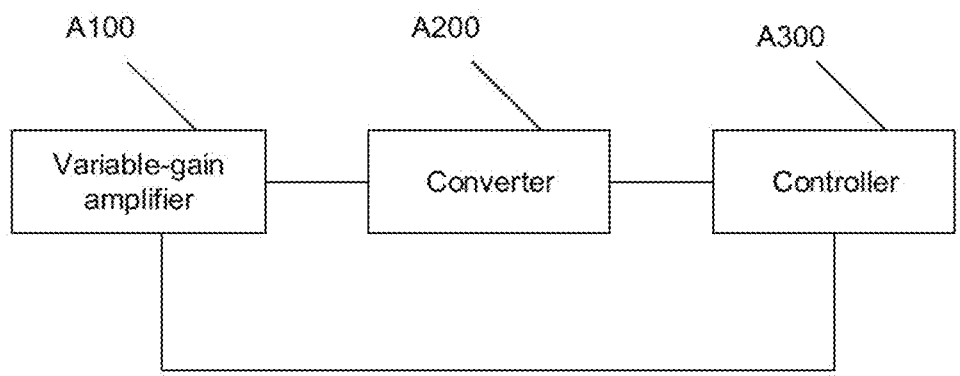
FIG. 4 is a schematic diagram of a Lidar ranging system in accordance with some embodiments of the present application.

FIG. 4 is a schematic diagram of a Lidar ranging system A10 in accordance with some embodiments of the present application. The Lidar ranging system A10 may include a variable-gain amplifier A100, a converter A200, and a controller A300. The variable-gain amplifier A100 may be connected to the converter A200. The converter A200 may be connected to the controller A300.

The controller A300 may be configured to determine a ranging distance between the target object/reflector and the laser receiver according to an output signal of the converter A200, and then adjust the gain of the variable-gain amplifier according to the ranging distance.

The variable-gain amplifier A100 is an electronic amplifier that varies its gain depending on a control voltage. The variable-gain amplifier A100 may be connected to the converter A200 and may be used to amplify the photocurrent signal that corresponds to the reflected optical signal and outputted from the laser receiver A22 and conduct gain compensation to the reflected signal to provide a constant signal or substantially amplitude to the converter A200. In addition, the gain value of the variable-gain amplifier A300 may be adjusted by the controller A300. The variable-gain amplifier A100 may be an analog-controlled variable-gain amplifier or a digitally-controlled variable-gain amplifier.

The converter. A200 may be connected to the variable-gain amplifier A100, and may be configured to convert an analog voltage signal to a digital voltage signal, and then transmit the converted digital signal to the controller A300. In some embodiments, the interface of the converter A200 to connect to the variable-gain amplifier A100 and the controller A300 may be a parallel port, or a high-speed serial interface such as LVDS or JESD.

The controller A300 may be connected to the converter A200. The controller A300 may determine the ranging distance between the target object and the laser receiver A100 according to the output signal of the converter A200 by analyzing the time of flight of the signal, and adjust the gain of the variable-gain amplifier according to the ranging distance, wherein the ranging distance may be obtained by multiplying the time of flight and the speed of light. In some embodiments, the controller A300 may be one or more Acorn RISC Machine (ARM) chips, Digital Signal Processing (DSP) chips or a Field-Programmable Gate Array (FPGA) chips, etc. The controller A300 may determine the gain value that the variable-gain amplifier A100 needs to adjust according to a correlation between the ranging distance and gain of the Lidar ranging system.

Figure 5:
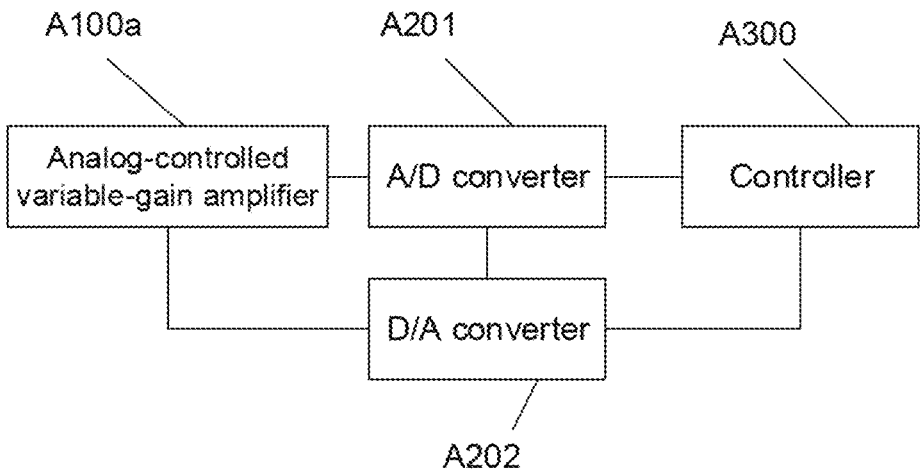
FIG. 5 is a schematic, diagram of a War ranging system in accordance with some embodiments of the present application.

The controller A300 may determine the ranging distance between the target object and the laser receiver A22 based on the output voltage signal of the converter A200. The controller A200 in turn may adjust the gain of the variable-gain amplifier according to the ranging distance. In this way, the Lidar ranging system A10 may compensate for a change in the amplitude of the optical signal due to distance change (such as the decrease of the amplitude of the optical signal due to a farther distance), so that the amplitude of the received signal remains substantially stable regardless of an amplitude of the photocurrent signal (e.g., substantially the same or greater than a preset threshold) within in a long range of ranging. Therefore, the Lidar ranging system A10 in FIG. 4 solves the problem that the farther the ranging distance, the weaker the optical signal detected by the Lidar. Accordingly, the Lidar's dynamic range of signal detection, the Lidar's ranging performance, as well as ranging capability are improved, FIG. 5 is a schematic, diagram of a Lidar ranging system A10-1 in accordance with some embodiments of the present application. The Lidar ranging system A10-1 may include a variable-gain amplifier A100a, a controller A300, and a converter.

The variable-gain amplifier A100a may be an analog-controlled variable-gain amplifier. The converter may further include a first converter A201 and a second converter A202 The first converter A201 may be an A/D converter and the second converter A202 may be a D/A converter A202. The input of the A/D converter A201 may be connected to, the output of the analog-controlled variable-gain amplifier A100a; the output of the A/D converter A201 may be connected to the input of the controller A300. The input of the D/A converter A202 may be connected to the output of the controller A300, and the output of the D/A converter A202 may be connected to the control terminal of the analog-controlled variable-gain amplifier A100a.

Specifically, the analog-controlled variable-gain amplifier A100a may adjust its gain according to an analog gain control signal sent by the controller A300. Since the signals transmitted and received by the analog-controlled variable-gain amplifier A100a are analog signals, the signals transmitted and received by the controller A300 are digital signals, the Lidar ranging system A10-1 needs to implement conversion between the analog signals and the digital signals. The A/D converter A201 may convert an analog signal transmitted by the analog-controlled variable-gain amplifier A100 into a digital signal and transmit it to the controller A300. The controller A300 may determine the ranging distance between the target object and the laser receiver A22 based on the time of flight of the received digital signal from the A/D converter A201. Then, the controller A300 may determine the gain of the analog-controlled variable-gain amplifier A100a according to the ranging distance, and transmit a corresponding digital control signal to the D/A converter A202. The D/A converter A202 may convert the digital control signal sent by the controller A300 into an analog control signal and send it to the analog-controlled variable-gain amplifier A100a. The analog-controlled variable-gain amplifier A100a may adjust its, gain value based on the received analog control signal. For example, the controller A300 can determine the ranging distance between the target object and the laser receiver A22 by analyzing the time of flight of the received digital signal. Further, the controller A300 can determine the gain value of the analog-controlled variable-gain amplifier A100a according to the preset distance-gain curve.

In summary, in FIG. 5, the variable-gain amplifier A100a may be an analog-controlled variable-gain amplifier. The converter may include the A/D converter A201 and the D/A converter A202. The A/D converter A201 may convert the analog signal output from the analog-controlled variable-gain amplifier A100a into the digital signal and send it to the controller A300. The D/A converter A202 may convert the digital control signal sent by the controller A300 into the analog control signal and send it to the analog-controlled variable-gain amplifier A100a Through the A/D converter A201 and the D/A converter A202, the Lidar ranging system A10-1 may use the digital controller A300 to adjust the gain of the analog-controlled variable-gain amplifier A100a. At close detection range, the controller A300 may control the analog-controlled variable-gain amplifier A100a to reduce its gain; at long detection range, the controller A300 may control the analog-controlled variable-gain amplifier A100a to increase its gain. Therefore, the Lidar ranging system A10-1 in FIG. 5 solves the problem that the farther the ranging distance, the weaker the optical signal is detected by the Lidar. Accordingly, the Lidar's dynamic range of signal detection signal is improved, thereby improving the Lidar's ranging performance and ranging, capability.

Figure 6:
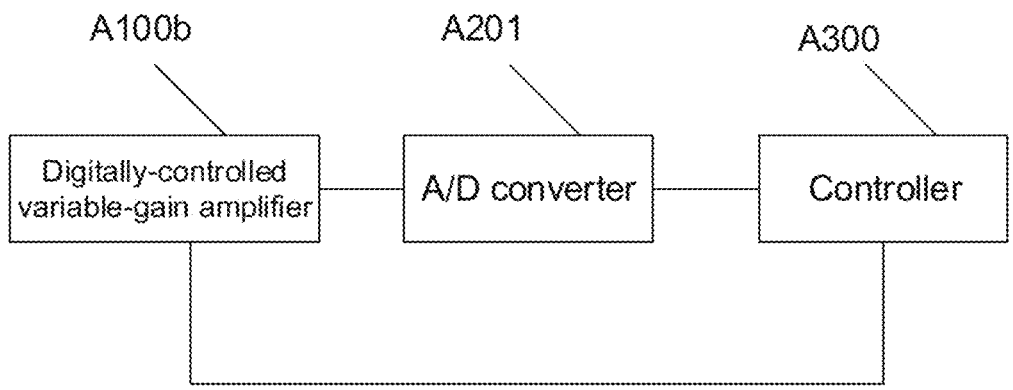
FIG. 6 is a schematic diagram of a Lidar ranging system according to some embodiments of the present application.

FIG. 6 is a schematic, diagram of a Lidar ranging system A10-2 according to some embodiments of the present application. The Lidar ranging system A10-2 may include a variable-gain amplifier A100b, a converter A201, and a controller A300. The variable-gain amplifier A100b may be a digitally-controlled variable-gain amplifier. The controller A300 may be a digital controller. The converter A201 may be an A/D converter. An input end of the A/D converter A201 may be connected to an output end of the digitally-controlled variable-gain amplifier A100b, and an output end of the A/D converter A201 may be connected to the input of controller A300.

Specifically, the output signal of the digitally-controlled variable-gain amplifier A100b may be an analog signal. The signal received and transmitted by the controller A300 may be digital signals. Therefore, the A/D converter A201 may be required in the system to convert analog signals to digital signals. Correspondingly, by connecting the input end of the A/D converter A201 to the output end of the digitally-controlled variable-gain amplifier A100b, and connecting the output end of the A/D converter A201 to the input end of the controller A300 the A/D converter A201 may convert the analog signal output from the digitally-controlled variable-gain amplifier A100b into a digital signal, and then transmit the digital signal to the controller A300. Further, the controller A300 may directly control and adjust the gain of the digitally-controlled variable-gain amplifier A100b through the digital interface of the digitally-controlled variable-gain amplifier A100b. The controller A300 may determine a ranging distance between the target object and the laser receiver A22 according to the time of flight of the received digital signal (which corresponds to the reflected laser beam), and determine the gain adjustment according to the ranging distance. Then, the controller A300 may directly control and adjust the gain value of the digitally-controlled variable-gain amplifier A100b through the digital interface of the digitally-controlled variable-gain amplifier A100b. For example, the controller A300 may determine a gain value of the analog-controlled variable-gain amplifier A100b according to a preset distance-gain curve.

In summary, in FIG. 6, the variable-gain amplifier A100b in the Lidar ranging system A10-2 may be a digitally-controlled variable-gain amplifier. The converter A201 may be an A/D converter. The A/D converter A201 may convert the analog signal output by the digitally-controlled variable-gain amplifier A100b into a digital signal and transmit it to the controller A300. The controller A300 may directly control the gain of the digitally-controlled variable-gain amplifier A100b through the digital interface of the digitally controlled digital-controlled variable-gain amplifier A100b. At close detection range, the controller A300 may reduce the gain of the digitally-controlled variable-gain amplifier A100b; at long detection range, the controller A300 may increase the gain of the digitally controlled variable gain amplifier (digitally-controlled variable-gain amplifier) A100b, Therefore, the Lidar ranging system A10-2 in FIG. 6 solves the problem that the farther the ranging distance, the weaker the optical signal is detected by the Lidar. Accordingly, the Lidar's dynamic range of signal detection signal is improved, thereby improving the Lidar's ranging performance and ranging capability.

As can be seen, in the above Lidar ranging systems, the controller may determine a target gain value for the variable-gain amplifier corresponding to a distance between the target object and the Lidar, based on a mapping relationship between the gain of the variable-gain amplifier and the distance. Further, the controller may adjust the gain of the variable-gain amplifier according to the target gain value. The controller may instruct the variable-gain amplifier to decrease the gain when the target object is at a close distance; the controller 300 may instruct the variable-gain amplifier to increase the gain when the target object is at a long distance. Through such a solution, the Lidar ranging system proposed in the present application solves the problem that the farther the ranging distance, the weaker the optical signal is detected by the Lidar. Accordingly, the Lidar's dynamic range of signal detection signal is improved, thereby improving the Lidar's ranging performance and ranging capability.

Figure 7A:
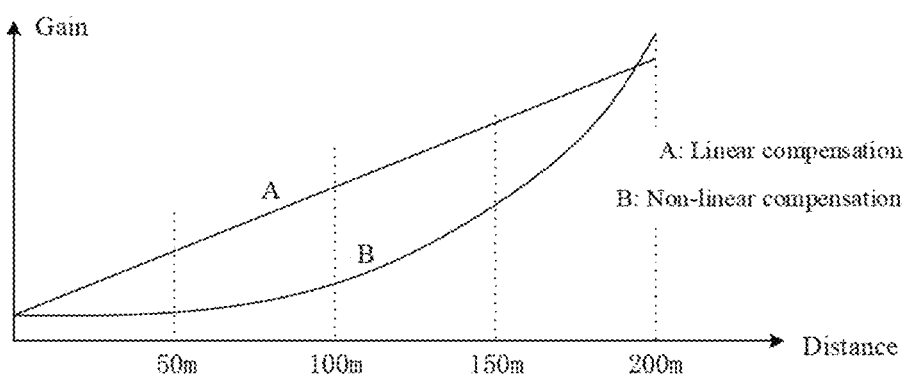
FIG. 7A is a schematic diagram of a distance-gain curve of a Lidar ranging system in accordance with some embodiments of the present application.

FIG. 7A is a schematic diagram of a distance-gain curve of a Lidar ranging system in accordance with some embodiments of the present application; FIG. 76 illustrate a distance-signal amplitude relation the Lidar ranging system in accordance with some embodiments of the present application.

In FIG. 7A, the mapping relationship is a distance-gain curve. The distance-gain curve may be a linear compensation curve (line A in the figure) or a nonlinear compensation curve (curve B in, the figure). In FIG. 7A, the horizontal axis indicates the distance between the target object and the laser receiver, and the vertical axis indicates the gain value of the variable-gain amplifier. As can be seen from the figure, the gain value increases as the distance increases. Therefore, the Lidar ranging system may use both the linear compensation curve or the nonlinear compensation curve when determining the mapping relationship between the distance and the gain value.

Figure 7B:
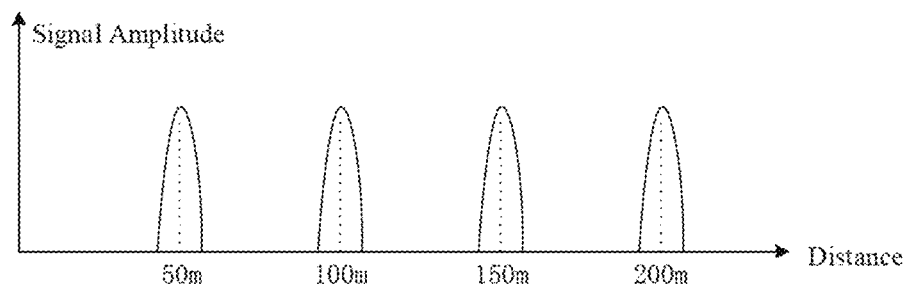
FIG. 7B illustrate a distance-signal amplitude relation the Lidar ranging system in accordance with some embodiments of the present application.

In FIG. 7B, the horizontal axis indicates the distance between the target object and the laser, receiver, and the vertical axis indicates the signal amplitude detected by the Lidar. As can be seen from the figure, as the distance between the target object and the laser receiver increases, the signal amplitude remains substantially unchanged. Therefore, the Lidar's dynamic range of signal detection signal is improved, thereby improving the Lidar's ranging performance and ranging capability.

The second technical problem raised in the foregoing is that when the reflected optical signal is strong (e.g. when the photocurrent signal of the optical sensor is at mA level), the reflected optical signal may cause signal saturation to the Lidar's detection result when the photocurrent signal is amplified by the Lidar. This in turn causes waveform distortion of the Lidar's detection result and produces a nonlinear amplified waveform. As a result, the signal receiving time T2 (e.g., the signal peak time) cannot be accurately obtained, which leads to many problems such as inaccurate measurement of ranging distance and inaccurate measurement of the laser reflection information. In order to solve this technical problem, the present application further proposes the following design schemes based on the foregoing embodiments.

Figure 8:
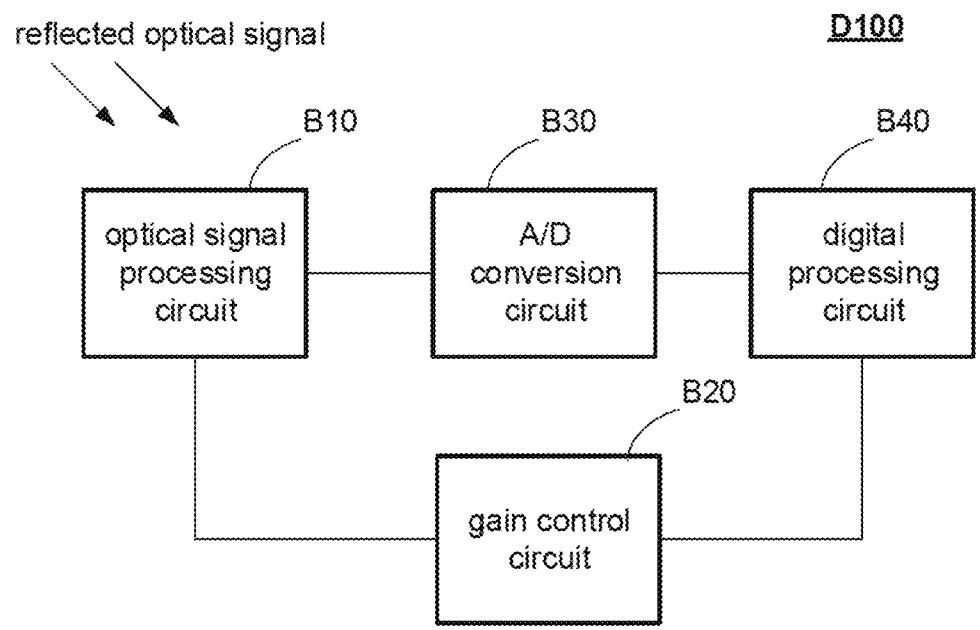
FIG. 8 is a schematic, diagram of the Lidar signal receiving circuit according to embodiments of the present application.

FIG. 8 is a schematic diagram of the Lidar signal receiving circuit D100 according to some embodiments of the present application. The Lidar signal receiving circuit D100 may include an optical signal processing circuit B10, a gain control circuit B20, a conversion circuit B30, which may include an analog to digital conversion circuit (A/D conversion circuit), and digital processing circuit 40. Comparing to the Lidar ranging system A10, the amplifier A100 may be part of the optical signal processing, circuit B10, the converter A200 may be part of the conversion circuit B30, and the digital processing circuit B40 may be part of the controller A300.

The optical signal processing circuit B10 may be configured to receive the reflected optical signal and convert the reflected optical signal into an analog voltage signal.

The A/D conversion circuit B20 may be connected to the optical signal processing circuit B10 and the digital processing circuit B40. Further, the A/D conversion circuit B20 may be configured to receive the analog voltage signal from the optical signal processing circuit B10 and convert the analog voltage signal into a digital voltage signal. Then, the A/D conversion circuit B20 may send the digital voltage signal to the digital processing circuit B40.

The gain control circuit B20 may be connected to the optical signal processing circuit B10 and the digital processing circuit B40. The gain control circuit B20 may be configured to receive control strategies from the digital processing circuit B40, convert the control strategies to control signals, and then send the control signals to the optical signal processing circuit B10 to control a gain of the optical signal processing circuit B10 according to the control signals.

The digital processing circuit B40 may be configured to receive the digital voltage signal from the A/D converter B30, and detect/deter/line whether the digital voltage signal is saturated. If the digital voltage signal is saturated, the digital processing circuit B40 may generate and send out control strategies to the gain control circuit B20, which accordingly control the optical signal processing circuit B10 to decrease the gain of the optical signal processing circuit B10. Alternatively, if the digital voltage signal is under-compensation, the digital processing, circuit B40 may generate and send out the control strategies to the gain control circuit B20, which accordingly control the optical signal processing circuit B10 to increase the gain of the optical signal processing circuit B10. Of course, the Lidar signal receiving circuit D100 of the present embodiment may simultaneously detect/determine whether the digital voltage signal is saturated or under-compensation and execute the corresponding gain control strategy.

The method of which the digital processing circuit B40 determines whether the voltage signal is saturated may be of various ways. The present application does not intend to limit to a specific method. For example, the digital processing circuit B40 may determine whether the maximum amplitude of the voltage signal is higher than the upper limit of the preset voltage amplitude, and then determine whether, through integration operation, an area of the voltage signal with respect to time in a preset time period, during which the reflected optical signal is detected, is higher than a preset threshold value for the upper limit of the integrated area.

Correspondingly, the method of which, the digital processing, circuit B40 determines whether the voltage signal is under-compensation may also be in multiple ways. The present application does not intend to limit to a specific method. For example, the digital processing circuit B40 may determine whether the voltage signal is under-compensation by determining whether the maximum amplitude of the voltage signal is lower than a lower limit of the preset voltage amplitude, and then determining whether, through integration operation, an area of the voltage signal with respect to a time period, during which the reflected optical signal is detected, is lower than a preset threshold value for the lower limit of the integrated area.

The parameters such as the upper limit of the preset voltage amplitude and the lower limit of the preset voltage amplitude may depend on the electrical performance of each component in the Lidar signal receiving circuit D100, and can be obtained through testing.

It should be understood that the gain control circuit B20 may correspond to the optical signal processing circuit B10. For example, if the optical signal processing circuit includes an M-level gain structure, the gain control circuit may include a gain, control structure associated with at least one of the M-level gain structures, so that the gain control structure may control the gain of the associated gain structure, where M is an integer greater than zero.

It can also be understood that, to achieve flexible control of the gain over a wide range, the gain control circuit B20 may include M gain control structure, associated with the M-level gain structures, each of the M gain control structure is associated with a corresponding gain structure in the M-level gain structure, so that the gain control circuit B20 may be able to control the gain of each level of the M-level gain structure. However, generally limited by cost and the like, the gain control structure may only control part of the gain structure. For example, the gain control circuit B20 may include a gain control structure associated with one of the M-level gain structure.

The following shows schematic diagrams of the Lidar signal receiving, circuit D100 with more details of the optical signal processing circuit B10 as well as the corresponding gain control, circuits B20. But one of ordinary skill in, the art would understand that by no means shall the exemplary structures be understood as the only options for the optical signal processing circuit B10 and the gain control circuit B20 of the present embodiment.

Figure 9A:
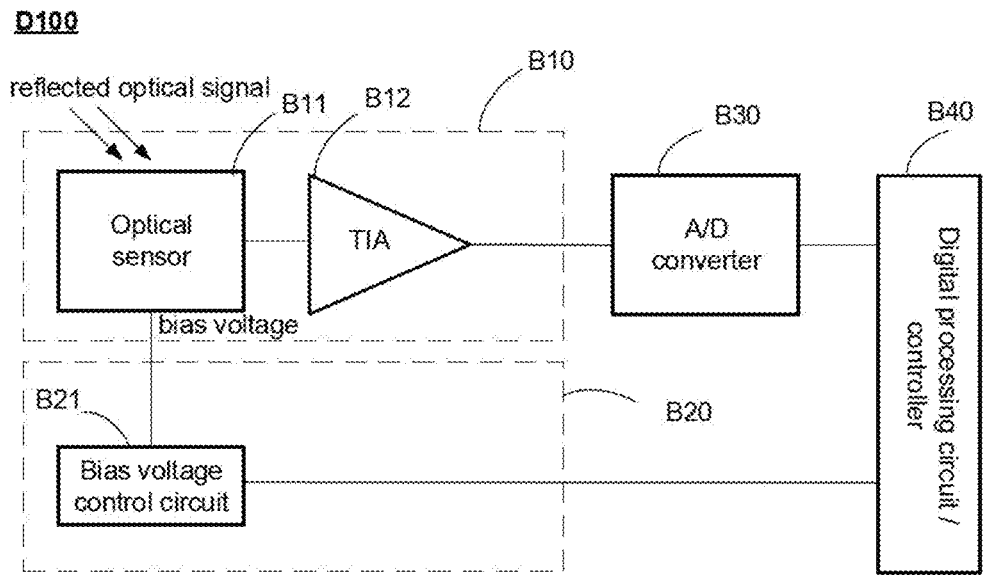
FIG. 9A illustrate a design of the Lidar signal receiving circuit according to embodiments of the present application.

FIG. 9A illustrate a design of the Lidar signal receiving circuit D100, which may include the optical signal processing circuit B10, the gain control circuit B20, the A/D converter circuit B30, and the Digital processing circuit B40.

The optical signal processing circuit B10 may include an optical sensor B11 and a transimpedance amplification circuit B12. The optical sensor B11 may be configured to receive the reflected optical signal and generate a corresponding photocurrent signal. The optical sensor B11 may be an array of the following devices or at least one of the following devices: APD (Avalanche Photo Diode), SIPM (Silicon Photomultiplier), SPAR; (Single Photon Avalanche Diode), MPPC (multi-pixel photon counter), PMT (photomultiplier tube) and the like. For example, the optical sensor B11 may be a single photon array sensor, which is composed of multiple single photon avalanche diodes, and has a gain of more than $10^6$. The single photon array sensor may detect extremely low power optical signals and is suitable for Lidar. The gain G of the single photon avalanche diode is the ratio of the charge generated by the working unit to the electron charge, and is calculated as follows:

$$G = \frac{C_{cell} \times V_{ov}}{q} = \frac{C_{cell} \times (V_{bias} - V_{br})}{q}$$

wherein, $C_{cell}$ is the equivalent capacitance of the single photon avalanche diode, $V_{ov}$ an overvoltage, $V_{br}$ is a breakdown voltage, $V_{bias}$ is a voltage of the bias-voltage control circuit, q is a unit charge. Considering at a stable working environment temperature, the breakdown voltage remains stable and the gain of the single photon array sensor is positively correlated with the voltage of the bias-voltage control circuit.

Figure 9B:
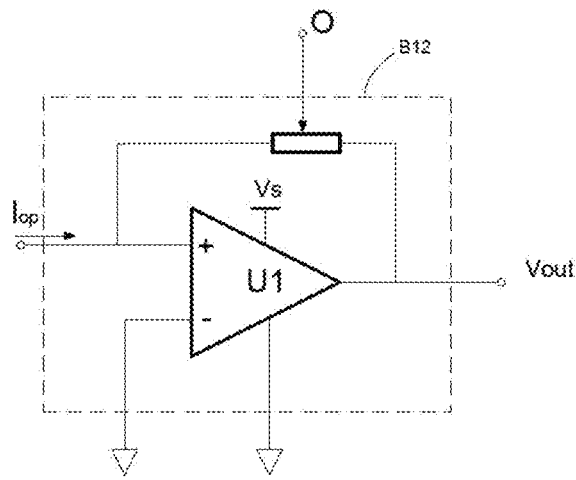
FIG. 9B is a structural diagram of a transimpedance amplifier according to embodiments of the present application.

The transimpedance amplification circuit (TIA circuit) B12 may be a transimpedance amplifier (TIA). FIG. 9B is a structural diagram of a simplest for of TIA B12. The TIA B12 is a current to voltage converter implemented with one or more operational amplifiers. The TIA B12 may include an operational amplifier component U1 and a transimpedance amplification resistor RT as a feedback resistor, wherein Vs is a supply, voltage of U1 and the small triangles represent ground voltage. The transimpedance amplifier may convert, and amplify, the photocurrent signal Iop into an analog voltage signal Vout. One of ordinary skill in the art would have understood that there are many ways to adjust the gain of the TIA 612. For example, since a character of the TIA is that gain of the TIA may be positively correlated with the resistance of the resistor RT, changing the resistance value of the feedback resistor RT may adjust the gain of the TIA. Accordingly, the gain of the TIA may be adjusted by adjusting the resistance value of RT from input O. The TIA circuit B12 may be connected with the optical sensor B11 to receive the photocurrent signal, and then the TIA circuit B12 may amplify the photocurrent signal and convert the photocurrent signal to an analog voltage signal, and then send the analog voltage signal to the A/D converter circuit B30.

Figure 9C:
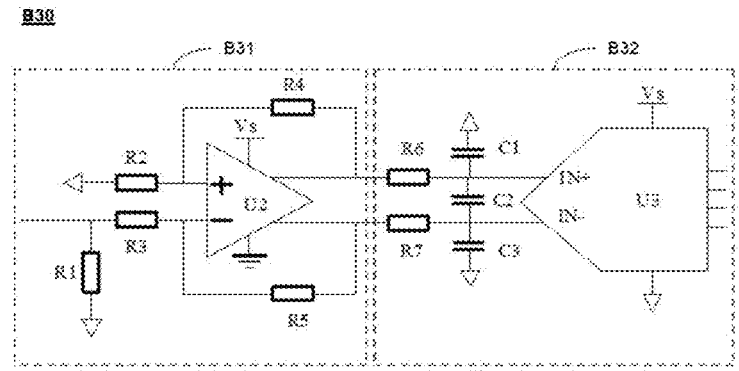
FIG. 9C is a structural diagram of an analog-to-digital conversion circuit according to embodiments of the present application.

The A/D converter circuit B30 may convert the analog voltage signal to a digital voltage signal, and then send the digital voltage signal to the digital processing circuit B40. The A/D conversion circuit B30 may include an A/D converter drive circuit and an A/D converter. FIG. 9C is a structural diagram of an A/D conversion circuit B30. The A/D converter driver, circuit B31 may be a single-ended signal to differential signal circuit, which may include U2 and R1~R5, wherein U2 is a fully differential amplifier, single-ended signal to differential signal circuit may convert a single-ended signal output from the front stage to a differential signal and conditioned the differential signal to the input range of the A/D converter B32 while driving the A/D converter B32 to conduct an A/D conversion. The A/D converter 32 may include A/D converters U3, resistors R6, R7, and capacitors C1, C2, and C3, wherein the front end R6, R7, C1, C2, and C3 of the A/D converter 32 may include an anti-aliasing filter, and can perform the A/D conversion on the differential signal output from the front stage to output a digital signal.

The gain control circuit B20 may include a bias-voltage control circuit B21. The bias-voltage control circuit B21 may be connected to the optical sensor B11 and may be configured to control a bias voltage of the optical sensor B11.

The digital processing circuit B40 may be, but not limited to, a FPGA chip (Field-Programmable Gate Array), a CPLD chip (Complex Programmable Logic Device), an ASIC chip (Application Specific Integrated Circuit), etc., wherein the ASIC chip may be a DSP chip (Digital Signal Processing).

The digital processing circuit B40 may be configured to determine a target bias voltage of the optical sensor B11 according to a current bias voltage of the optical sensor B11 and then generate and output a bias voltage control signal according to the target bias voltage. The bias voltage control signal may be used to instruct the bias voltage control circuit B21 to adjust the bias voltage of the optical sensor B21 to the target bias voltage. The target bias voltage is less than the current bias voltage when the digital voltage signal is saturated; the target bias voltage is greater than the current bias voltage when the digital voltage signal is under-compensated. For example, the bias-voltage control circuit B21 may include a bias voltage control line for transmitting the bias voltage control signal to the optical sensor B11. Through the bias voltage control line, the bias-voltage control circuit B21 may directly use the bias voltage control signal as them bias voltage to achieve a small range control of the bias voltage. When the optical signal processing circuit B10 includes a power supply for supplying a bias voltage to the optical sensor B11, the digital processing circuit B40 may transmit a bias voltage control signal to the power supply through the bias voltage control line to control the output of the power supply, thereby achieving a wide range of control of the bias voltage.

Taking the digital voltage signal saturation scenario as an example. There is a positive correlation between the bias voltage on the optical sensor B11 and the gain of the optical sensor B11. Therefore, the gain of the optical sensor B11 may become smaller after the current bias voltage is adjusted to the target bias voltage. There are various ways in which the digital processing circuit B40 can determine the target bias voltage based on the current bias voltage. For example, the digital processing circuit B40 may determine the target bias voltage by multiply the current bias voltage with an adjustment ratio. For example, the bias voltage adjustment ratio may be 5%, 8%, 20%, or the like. For example, the digital processing circuit B40 may use the difference between the current bias voltage and an adjustment step of the bias voltage as the target bias voltage. The adjustment step of the bias voltage may be fixed or dynamically changed. For example, the adjustment step of the fixed bias voltage may be 1V, 2V, 5V, or the like; the adjustment step of the dynamically varying bias voltage may be a preset ratio of the current bias voltage, such as 5%, 8%, 20%, and the like.

Additionally, the digital processing circuit B40 may calculate/determine the saturation of the digital voltage signal according to the amplitude of the digital voltage signal and a preset saturation threshold. The digital processing circuit B40 may determine a current gain step size (stride) for the digital voltage signal according to a preset positive correlation between the saturation and gain step, and control the gain control circuit B20 to reduce the gain of the optical signal processing circuit B10 at the current gain step size. For example, the digital processing circuit B40 may calculate/determine a degree of saturation of the digital voltage signal when the digital voltage signal is saturate, and determine an adjustment ratio of the bias voltage according to the degree of saturation and the preset correlation between saturation and the bias voltage; or, the digital processing circuit B40 may determine the adjustment step of the bias voltage according to the degree of saturation and the preset correspondence between the saturation and the adjustment step of the bias voltage. Wherein, the degree of saturation may be indicative of a degree to which a maximum amplitude of the voltage signal exceeds an upper limit of the preset voltage amplitude. Therefore, a difference between the maximum amplitude of the voltage signal and an upper limit of the preset voltage, amplitude may be used as the degree of saturation; or a ratio of the difference to the upper limit of the preset voltage amplitude may be used as a saturation. The degree of saturation may also be defined as the difference or the ratio between an area and an upper limit of the preset threshold for the area, wherein the area refers to an, integrated area of the voltage signal with respect to time in a preset time period, during which the reflected optical signal is detected. It can be understood that there is a negative correlation between the saturation and the adjustment ratio of the bias voltage, and the saturation is positively correlated with the adjustment step of the squirrel bias voltage.

Similarly, when the digital voltage signal is under-compensation, the digital processing circuit B40 may determine the degree of under-compensation based on the amplitude of the digital voltage signal and a preset threshold for the under-compensation. Further, the digital processing circuit B40 may determine the current gain step size corresponding to the digital voltage signal based on the preset positive correlation between the degree of under-compensation and gain step size, so as to control the gain control circuit B20 to increase the gain of the optical signal processing circuit B10 at the current gain step size. Here, the degree of under-compensation may be used to characterize the extent to which the maximum, amplitude of the voltage signal is below the lower limit of the preset voltage amplitude. Therefore, the degree of under-compensation may be defined as the difference between the lower limit of the preset voltage amplitude and the maximum amplitude of the voltage signal; the degree of under-compensation may also be defined as the ratio of the difference to the lower limit of the preset voltage amplitude; further, the degree of under-compensation may also be defined as the difference or ratio between an area and an lower limit of the preset threshold for the area, wherein the area is, an integrated area of the voltage signal with respect to time in a preset time period, during which the reflected optical signal is detected. The Lidar signal receiving circuit D100 may use the same or similar strategy for gain control The method or strategy for gain control when the digital voltage signal is under-compensation may be the same or substantially the same as that adopted in the Lidar signal receiving circuit D100 when the digital voltage signal is saturate. Therefore, details of the gain control are not described herein again.

Figure 9D:
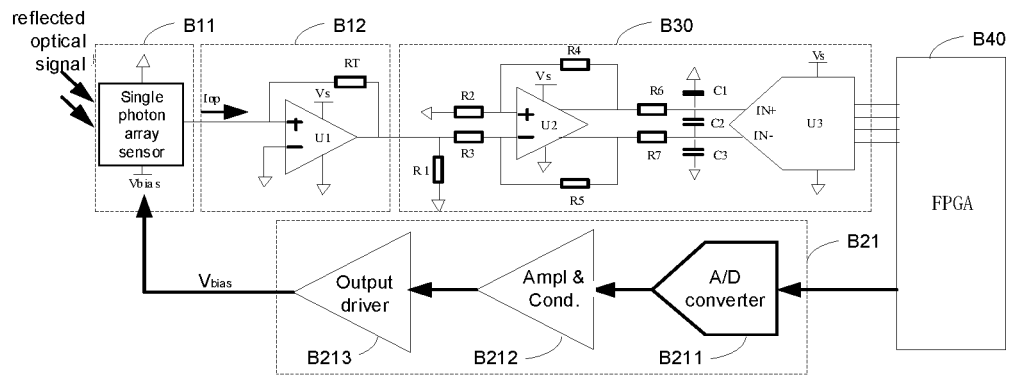
FIG. 9D illustrates a specific example of Lidar signal receiving circuit of FIG. 9A with more details.

FIG. 9D illustrates a specific example of Lidar signal receiving circuit D100 of FIG. 9A with more details.

The bias-voltage control circuit B21 may include: a first D/A convertor B211, a first amplification and conditioning circuit B211 and an output driver B213. The first D/A convertor B211 may be configured to convert a digital bias voltage control signal into an analog bias voltage control signal; the first amplification and conditioning circuit B212 may be configured to amplify and condition the analog bias voltage control signal to obtain a target bias voltage control signal; the output driver B213 may be configured to send the target bias voltage signal to the optical sensor B11.

Specifically, the digital processing circuit B40 may transmit a digital bias voltage control signal to the first D/A convertor B211 to output the analog bias voltage control signal. The bias voltage control signal may then be amplified and conditioned to an appropriate range by the first amplification and conditioning circuit B212, and then transmitted to the output driver B213. The output driver B213 may process the bias voltage control signal and provide the target bias voltage to the optical sensor B11, thereby implementing a wide range of control of the bias voltage.

In the present embodiment, when the digital processing circuit B40 detects that the digital voltage signal is saturate, the digital processing circuit B40 may reduce the gain of the optical sensor B11 by automatically reducing the bias voltage over the optical sensor B11. Meanwhile, when the digital processing circuit B40 detect that the digital voltage signal is under-compensated, the digital processing circuit B40 may raise the gain of the optical sensor B11 by automatically raising the bias voltage over the optical sensor B11.

With the high gain characteristics of the optical sensor B11, the digital processing circuit B40 may achieve a continuous, fine adjustment to the gain at a very high dynamic range. At the same time, since the optical sensor B11 is the signal source, the Lidar signal receiving circuit D100 may limit the amplitude of the output signal from the source to ensure that saturation or under-compensation will not occur in the subsequent circuits of the Lidar signal receiving circuit D100, thereby achieving high efficient anti-saturation gain control and anti-under-compensation gain control. In addition, the solution related to this embodiment does not affect the signal to noise ratio and bandwidth, therefore the signal quality can be guaranteed.

Figure 10A:
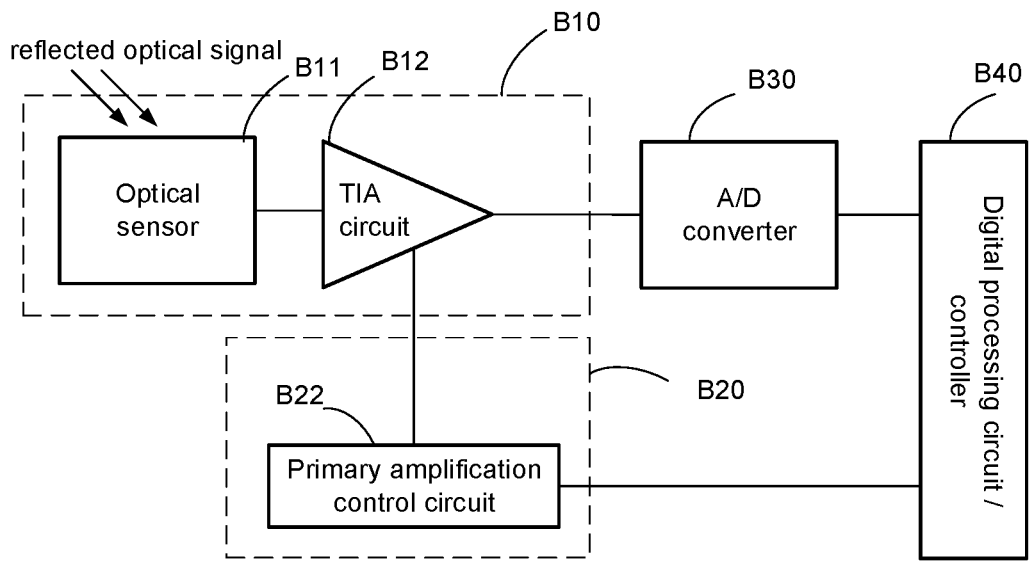
FIG. 10A illustrates a design of a Lidar signal receiving circuit according to embodiments of the present application.

FIG. 10A illustrates a design of the Lidar signal receiving circuit D100. The Lidar signal receiving circuit in FIG. 10A may have similar design as the Lidar signal receiving circuit in FIG. 9A other than the bias voltage control circuit B21. In FIG. 10A, the bias-voltage control circuit B21 of FIG. 9A is substituted by a primary amplification control circuit B22. The primary amplification control circuit B22 may be connected to the TIA circuit B12 to control the gain of the TIA circuit B12. Accordingly, the digital processing circuit B40 may determine a target TIA resistance based on a current TIA resistance of the TIA circuit, and then generate a TIA resistor control signal based on the target TIA resistance. The TIA resistor control signal may instruct the TIA circuit B12 (also called primary amplification control circuit) to adjust the TIA resistance to the target TIA resistance. When the digital voltage signal is saturate, the target TIA resistance is smaller than the current TIA resistance; when the digital voltage signal is under-compensation, the target TIA resistance is larger than the current TIA resistance. One of ordinary skill in the art would understand that the TIA resistance of the TIA circuit B12 may have a positive correlation with the gain of the TIA circuit B12. Therefore, the Lidar signal receiving circuit D100 may control the gain of the TIA circuit by adjusting the TIA resistance to the target TIA resistance.

For example, the TIA circuit B12 may include a dynamically adjustable resistor as its feedback resistor. The primary amplification control circuit B22 may be a signal line. The digital signal processing circuit B40 may adjust the resistance of the feedback resistor via the primary amplification control circuit. Similar to the method shown in FIG. 9A, where a bias voltage control circuit is applied to the Lidar signal receiving circuit A130, there may be various methods for the digital processing circuit B40 to determine the target TIA resistance, and details of which will not be repeated here.

Figure 10B:
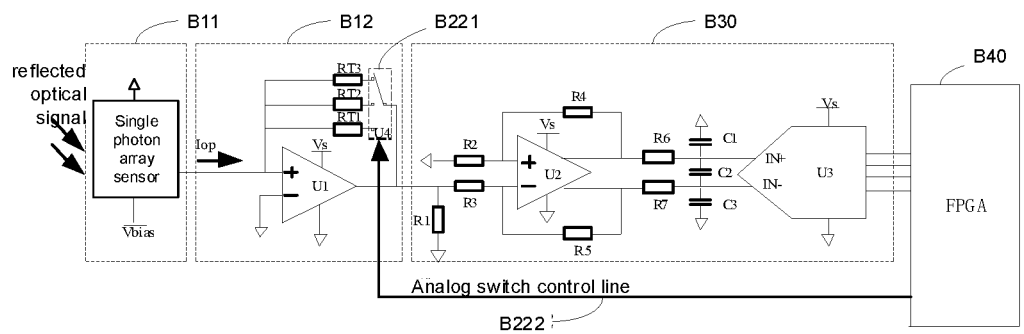
FIG. 10B illustrates a specific example of Lidar signal receiving circuit of FIG. 10A with more details.

FIG. 10B illustrates a specific example of Lidar signal receiving circuit D100 of 10A with more details.

In FIG. 10B, the TIA circuit B12 may include a plurality of candidate TIA resistors RT1, RT2, RT3, The primary amplification control circuit B22 may include an analog switch B221. By switching between the plurality of candidate TIA resistors RT1, RT2, RT3, the analog switch B221 may select a target TIA resistor from the plurality of candidate TIA resistors. Correspondingly, the digital processing circuit B40 may determine the target TIA resistance based on the current TIA resistor selected by the analog switch B221, and then generate the TIA resistance control signal based on the target TIA resistance. The TIA resistance control signal may control the analog switch B221 to switch from the current TIA resistor to a target TIA resistor, wherein the TIA resistor has the target TIA resistance, thereby switching between different levels of TIA circuit gain. The primary amplification control circuit may further include an analog switch control line B222, connecting the digital processing circuit B40 with the analog switch B221, to transmit the TIA resistance control signal. For example, the digital signal processing circuit B40 may store the corresponding resistance of each of the plurality of candidate resistors RT1, RT2, RT3, etc., as well as a rank of these candidate resistors. The rank may be from large to small, such as RT1>RT2>RT3. The digital processing circuit B40 may select the TIA resistor next to the current TIA resistor in the rank as the target TIA resistor. For example, for the rank RT1>RT2>RT3, if the current TIA resistor is RT3, then RT3 may be selected as the target TIA resistor.

In the present embodiment, when the digital processing circuit B40 detects that the digital voltage signal is saturate, the digital processing circuit B40 may automatically reduce the gain of the TIA circuit B12 by reducing the TIA resistance via the primary amplification control circuit B20. When the digital processing circuit B40 detects that the digital voltage signal is under-compensated, the digital processing circuit B40 may automatically increase the gain, of the TIA circuit B12 by increasing the TIA resistance via the primary amplification control circuit B20.

Figure 11A:
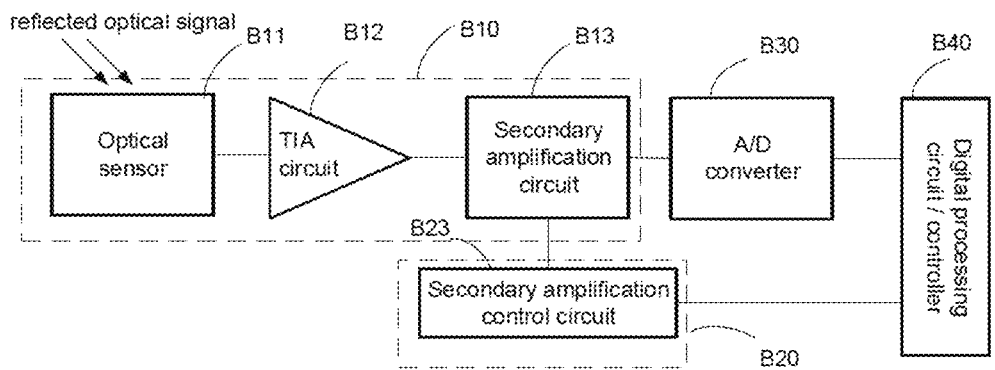
FIG. 11A illustrates a design of a Lidar signal receiving circuit according to embodiments of the present application.

FIG. 11A illustrates a design of the Lidar signal receiving circuit D100. The Lidar signal receiving circuit in FIG. 11A may include the optical signal processing circuit B10, the gain control circuit B20, the A/D converter B30, and the Digital processing circuit B40.

The optical signal processing circuit B10 may include the optical sensor B11, the TIA circuit B12, and a secondary amplification circuit B13, which may be sequentially connected with each other. Correspondingly, the gain control circuit B20 may include a secondary amplification control circuit B23.

The secondary amplification control circuit B23 may be connected to the secondary amplification circuit B13 and the digital processing circuit B40 to control the gain of the secondary amplification circuit B13. The digital processing circuit B40 may determine the target gain of the secondary amplification circuit B13 based on a current gain of the secondary amplification, circuit B13. Then the digital, processing circuit B40 may generate and send out a gain control signal based on the target gain. The gain, control signal may instruct the secondary amplification control circuit B23 to control the secondary amplification circuit B13 and to adjust its gain from the current gain to the target gain. Here, when the digital voltage signal is saturate, the target gain is smaller than the current gain; and when the digital voltage signal is under-compensated, the target gain is greater than the current gain.

Figure 11B:
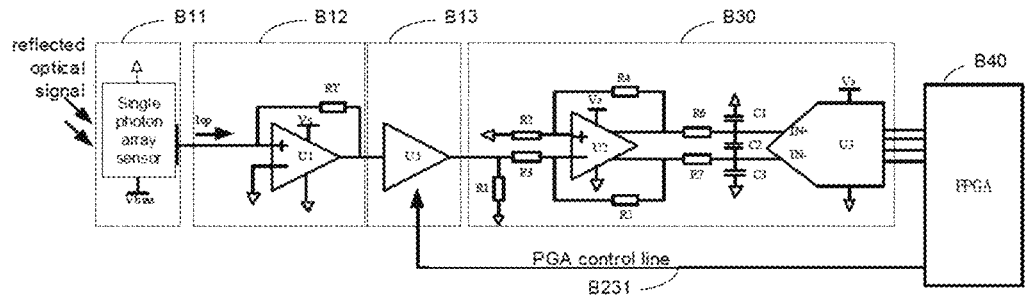
FIG. 11B illustrates a specific example of Lidar signal receiving circuit of FIG. 11A with more details.

FIG. 11B illustrates a specific example of Lidar signal receiving circuit D100 of FIG. 11A with more details.

In FIG. 11B, the secondary amplification circuit B13 may include a programmable-gain amplifier (PGA) U5, which may include a plurality of gain levels. The PGA B13 may switch between different gain levels through programming. Accordingly, the digital processing circuit B40 may determine a target gain level based on a current gain level of the PGA B13, and then generate and output gain level signal based on the target gain level. The gain level control signal may instruct the PGA B13 to switch gain level. When the digital voltage signal is saturate, the gain corresponded to the target gain level may be smaller than the gain corresponded to the current gain level; and when the digital voltage signal is under-compensated, the gain corresponded to the target gain level may be greater than the gain corresponded to the current gain level. The secondary amplification control circuit B20 may also, include a PGA control line B231 to transmit the gain level control signal to the PGA B13.

Figure 11C:
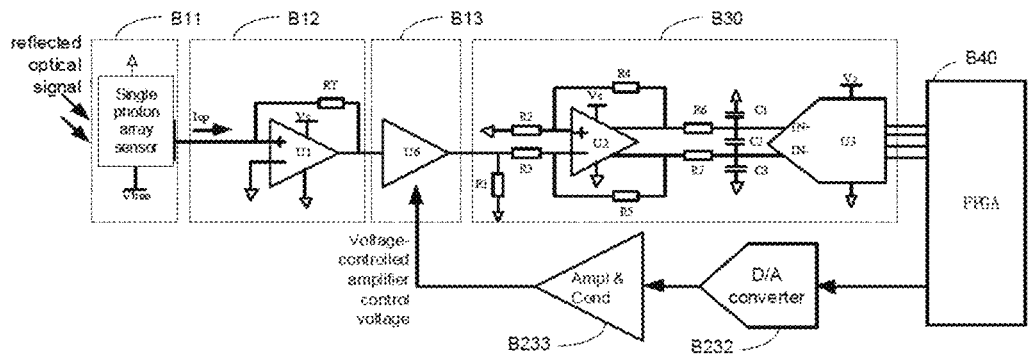
FIG. 11C illustrates another specific example of Lidar signal receiving circuit of FIG. 11A with more details.

FIG. 11C illustrates another specific example of Lidar signal receiving circuit D100 of FIG. 11A with more details.

In FIG. 11C, the secondary amplification circuit B13 may include a voltage-controlled amplifier U6, which is also called variable gain amplifier. The gain of the voltage-controlled amplifier may be adjusted by supplying a gain control voltage. Accordingly, the digital processing circuit B40 may determine a target gain control voltage for the voltage-controlled amplifier based on a current gain control voltage of the voltage-controlled amplifier, and then generate and output a control signal for the gain control voltage, based on the target gain control voltage. The control signal for the gain control voltage may instruct the voltage-controlled amplifier B13 to adjust its gain control voltage to the target gain control voltage. When the digital voltage signal is saturate, the target gain control voltage is lower than the current gain control voltage: and when the digital voltage signal is under-compensated, the target gain control voltage is higher than the current gain control voltage.

The secondary amplification control circuit B13 in FIG. 11C may also include a gain voltage control line to transmit the control signal for the gain control voltage to the voltage-controlled amplifier B13. This way, the control signal for the gain control voltage may be directly used as the gain control voltage to adjust the gain control voltage in small range. But when the secondary amplification circuit includes a power supply that provides a gain control voltage for the voltage-controlled amplifier, the digital processing circuit B40 may achieve wider range control to the gain control voltage by transmitting a control signal of the gain control voltage to the power supply via the gain control, voltage control line to control the output voltage of the power supply.

The secondary amplification control circuit B23 may further include a second D/A converter B232 and a second amplification and conditioning circuit B233. The second D/A converter B232 may convert the digital gain control voltage, signal into analog gain control voltage signal. The second amplification and conditioning circuit B233 may amplify and condition the analog gain control voltage signal to obtain the target gain control voltage signal. Then, the second amplification and conditioning circuit B233 may output the target gain control voltage signal to the voltage-controlled amplifier B13 to provide a wider range of target gain control voltage to the voltage-controlled amplifier B13.

In the Lidar signal receiving circuit D100 shown in FIG. 11C, when the digital processing circuit B40 detects that the digital voltage signal is saturate, the digital processing circuit B40 may automatically reduce the gain of the secondary amplification control circuit B12 via the secondary amplification control circuit B23. When the digital processing circuit B40 detects that the digital voltage signal is under-compensated the digital processing circuit B40 may automatically increase the gain of the secondary amplification control circuit B12 via the secondary amplification control circuit B23.

Figure 12:
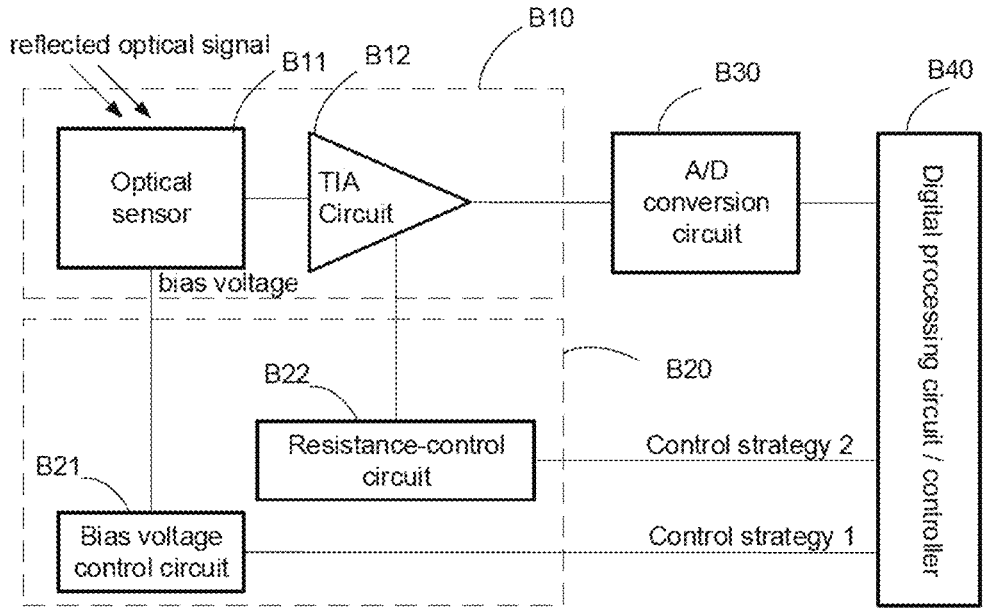
FIG. 12 illustrate another design of the Lidar signal receiving circuit according to embodiments of the present application.

FIG. 12 illustrate another design of the Lidar signal receiving circuit D100, which may include the optical signal processing circuit B10, the gain control, circuit B20, the A/D converter B30, and the Digital processing circuit B40.

The optical signal processing circuit B10 may include an optical sensor B11 and a transimpedance amplification circuit B12. The optical sensor B11 may be configured to receive the reflected optical signal and generate a corresponding photocurrent signal.

The A/D conversion circuit B30 may include an A/D converter drive circuit, and an A/D converter, such as the A/D converter shown in FIG. 9C.

The transimpedance amplification circuit (TIA circuit) B12 may be a transimpedance amplifier (TIA), such as the TIA shown in FIG. 9B. The TIA circuit B12 may be connected with the optical sensor B11 to receive the photocurrent signal, and then the TIA circuit B12 may be configured to amplify the photocurrent signal and convert the photocurrent signal, to an analog voltage signal. The A/D converter B30 may convert the analog voltage signal to a digital voltage signal, and, then send the digital voltage signal to the digital processing circuit B40.

The gain control circuit B20 may, accordingly, include at least one of the following: the bias-voltage control circuit B21 and the resistance-control circuit B22, details of which have been introduced elsewhere in the present application. The bias-voltage control circuit B21 may be connected to the optical sensor B11 and may be configured to control a bias voltage of the optical sensor B11. The resistance-control circuit B22 may be connected with the TIA circuit B12 to control the resistance of the feedback resistor RT of the TIA circuit B12. For example, the TIA circuit B12 may include a plurality of candidate resistors, and the resistance-control circuit B22 may include an analog switch. The digital signal processing circuit B40 may control the analog switch via the resistance-control circuit B22 to select between the plurality of candidate resistors. Alternatively, the TIA circuit B12 may include a dynamically adjustable resistor, wherein the digital signal processing circuit B40 may adjust the resistance value of the dynamically adjustable resistor through the resistance-control circuit B22.

Details of the digital processing circuit B40 have been introduced elsewhere in the present application. When the digital processing circuit B40 detects that the digital voltage signal input to the digital processing circuit B40 is saturated, the digital processing circuit B40 may control the gain control circuit B20 to reduce the gain of the optical signal processing circuit B10, and achieve the effect of automatically reducing the gain. It can be understood that, after the gain is reduced, if the digital processing circuit B40 detects that the digital voltage signal is still saturated, the data processing circuit B40 may control the gain control circuit B20 to further reduce the gain of the optical signal processing circuit B10 until the digital voltage signal is not saturated, thereby solving technical problems such as inaccurate measurement of ranging distance and laser reflection information due to signal saturation, and improving the accuracy of ranging distance and laser reflection information measurement. In addition, when the digital processing circuit B40 detects the digital voltage signal sent from the A/D converter under-compensated, the digital processing circuit B40 may control the gain control circuit B20 to increase the gain of the optical signal processing circuit, thereby achieving an effect of automatically increasing the gain. After the gain is increased, if the digital voltage signal is still under-compensated, the digital processing circuit B40 may control the gain control circuit B20 to continue to increase the gain of the optical signal processing circuit B10 until the voltage signal is no longer under-compensated, thus solving the problems of too short ranging distance and low sensitivity due to signal under-compensation, and improving the ranging distance and sensitivity. In summary, the Lidar signal receiving circuit D100 in this embodiment may automatically adjust the gain and achieve intelligent control to the gain of the optical signal processing circuit.

Figure 13:
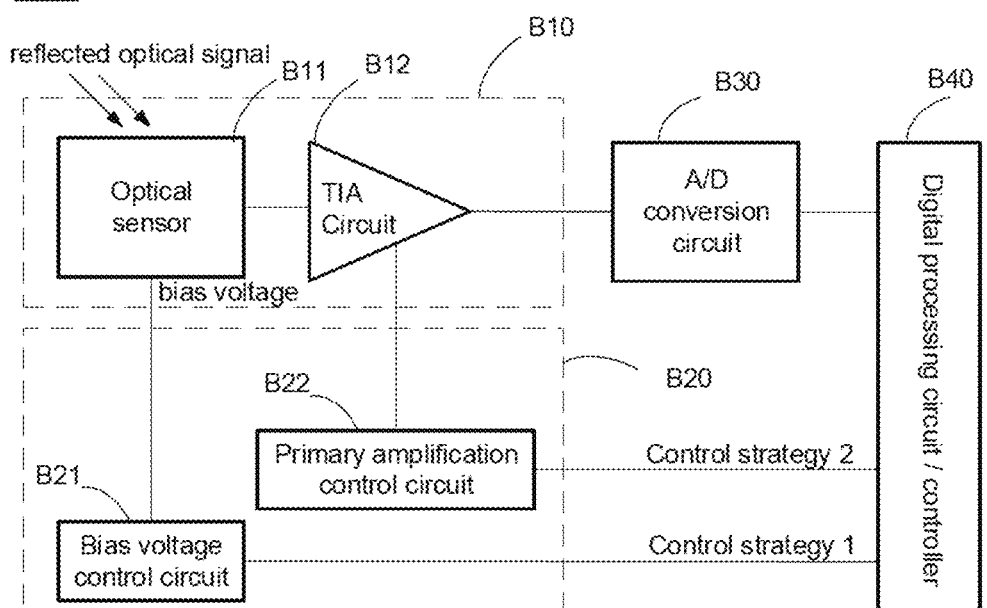
FIG. 13 illustrate another design of the Lidar signal receiving, circuit according to embodiments of the present application.

FIG. 13 illustrate another design of the Lidar signal receiving circuit D100, which may include the optical signal processing circuit B10 the gain control circuit B20, the A/D converter B30, and the Digital processing circuit B40.

The optical signal processing circuit B10 may include the optical sensor B11 and the TIA circuit B12. The optical sensor B11 may be configured to receive the reflected optical signal and generate a corresponding photocurrent signal. The TIA circuit B12 may be connected with the optical sensor B11 to receive the photocurrent signal, then the TIA circuit B12 may amplify the photocurrent signal and convert the photocurrent signal to an analog voltage signal. The A/D converter B30 may convert the analog voltage signal to a digital voltage signal, and then send the digital voltage signal to the digital processing circuit B40.

The gain control circuit B20 may include the bias-voltage control circuit B21. The bias-voltage control circuit B21 may be connected to the optical sensor B11 and the digital processing circuit B40 to receive an instruction from the digital processing circuit B40 and to control a bias voltage of the optical sensor B11 accordingly. The gain control circuit B20 may also include the primary amplification control circuit B22. The primary amplification control circuit B22 may be connected to the TIA circuit B12 and the digital processing circuit B40 to receive an instruction from the digital processing circuit B40 and to control the amplification gain of the TIA circuit B12 accordingly.

Figure 14:
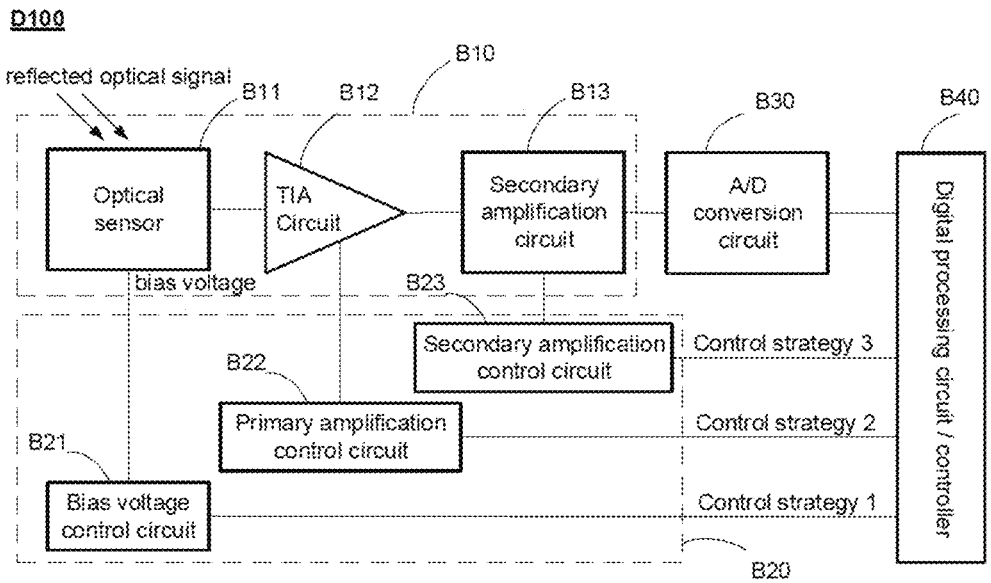
FIG. 14 illustrate another design of the Lidar signal receiving circuit according to embodiments of the present application.

FIG. 14 illustrate another design of the Lidar signal receiving circuit D100, which may include the optical signal processing circuit B10, the gain control circuit B20, the A/D converter B30, and the Digital processing circuit B40.

Similar to the Lidar signal receiving circuit shown in FIG. 13, the optical signal processing circuit B10 may include the optical sensor B11 the TIA circuit B12. In addition, the optical signal processing circuit B10 may further include a secondary amplification circuit B13 to connect between the TIA circuit B12 and the A/D converter B30. The TIA circuit B12 may receive the photocurrent signal from the optical sensor B11, and then amplify the photocurrent signal and convert the photocurrent signal to a primary analog voltage signal. The secondary amplification circuit B13 may receive the primary analog voltage signal and further amplify it to a secondary analog voltage signal. And then the A/D converter B30 may convert the secondary analog voltage signal to a digital voltage signal, and then send the digital voltage signal to the digital processing circuit B40.

The gain control circuit B20 may include the bias-voltage control circuit B21 to connect to the optical sensor B11. The gain control circuit B20 may, accordingly, include at least one of the following: the bias-voltage control circuit B21, the primary amplification control circuit B22, and the secondary amplification control circuit B23, The bias-voltage control circuit B21 may be connected to the optical sensor B11 and the digital processing circuit B40 to receive an instruction from the digital processing circuit B40 and to control a bias voltage of the optical sensor B11 accordingly. The primary amplification control circuit B22 may be connected to the TIA circuit B12 and the digital processing circuit B40 to receive an instruction from the digital processing circuit B40 and to control the amplification gain of the TIA circuit B12 accordingly. The secondary amplification control circuit B23 may be any type of circuit that is capable of control the gain of the TIA circuit B12. For example, the primary amplification control circuit B22 may be a resistance-control circuit, an exponential gain control circuit, or any combination thereof. The secondary amplification control circuit B23 may be connected to the secondary amplification circuit B13 and the digital processing circuit B40 to receive an instruction from the digital processing circuit B40 and to control the amplification gain of the secondary amplification circuit B13 accordingly. At the same time, the digital processing circuit B40 may control different gain control circuits B11, B12, B13 with different control strategies.

Figure 15:
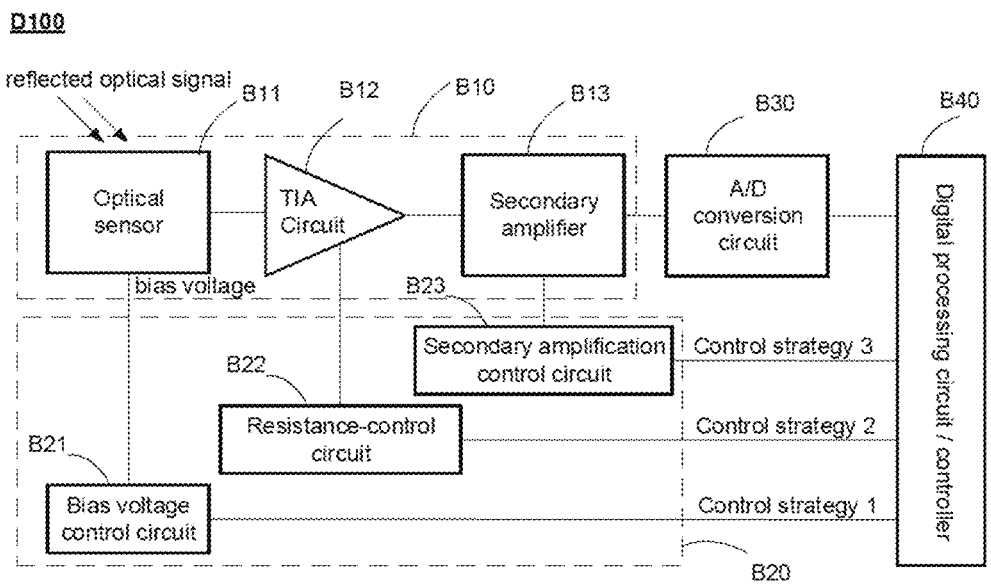
FIG. 15 illustrate another design of the Lidar signal receiving, circuit according to embodiments of the present application.

FIG. 15 illustrate another design of the Lidar signal receiving circuit D100, which may include the optical signal processing circuit B10, the gain control circuit B20, the A/D converter B30, and the Digital processing circuit B40.

Similar to the Lidar signal receiving circuit shown in FIG. 12, the optical signal processing circuit B10 may include the optical sensor B11 and the TIA circuit B12. In addition, the optical signal processing circuit B10 may further include a secondary amplification circuit B13 to connect between the TIA circuit B12 and the A/D converter B30. The TIA circuit B12 may receive the photocurrent signal from the optical sensor B11, and then amplify the photocurrent signal and convert the photocurrent signal to a primary analog voltage signal. The secondary amplification circuit B13 may receive the primary analog voltage signal and further amplify it to a secondary analog voltage signal. And then the A/D converter B30 may convert the secondary analog voltage signal to a digital voltage signal and then send the digital voltage signal to the digital processing circuit B40.

The gain control circuit B20 may include the bias-voltage control circuit B21 to connect to the optical sensor B11. The gain control circuit B20 may, accordingly, include at least one of the following: the bias-voltage control circuit B21, a resistance-control circuit B22, and a secondary amplification control circuit B23. The bias-voltage control circuit B21 may be connected to the optical sensor B11 and the digital processing circuit B40 to receive an instruction from the digital processing circuit B40 and to control a bias voltage of the optical sensor B11 accordingly. The resistance-control circuit B22 may be connected to the TIA circuit B12 and the digital processing circuit B40 to receive an instruction from the digital processing circuit B40 and to control the amplification gain of the TIA circuit B12 accordingly. The secondary amplification control circuit B23 may be connected to the secondary amplification circuit B13 and the digital processing circuit B40 to receive an instruction from the digital processing circuit B40 and to control the amplification gain of the secondary amplification circuit B13 accordingly. At the same time, the digital processing circuit B40 may control different gain control circuits B11, B12, B13 with different control strategies.

Figure 16:
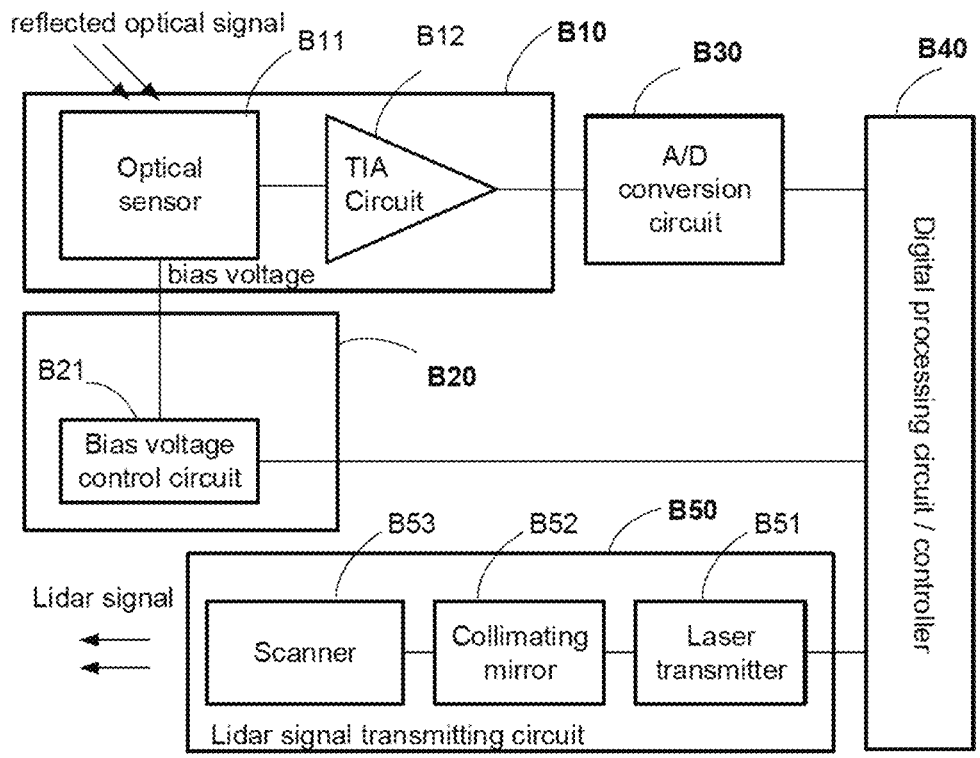
FIG. 16 shows a Lidar system according to embodiments of the present application.

According to some embodiments, the present application also provides a Lidar system. The Lidar system may include a Lidar signal transmitting circuit and any one or combination of the previously introduced Lidar signal receiving circuit. Purely for illustration purpose, FIG. 16 shows a Lidar system B800 of which adopts the Lidar signal receiving circuit D100 shown in FIG. 9A. One of ordinary skill in the art would understand that any Lidar signal receiving circuit disclosed in the present application may be applied in the Lidar system.

The digital processing circuit B40 may be connected with the Lidar sign transmitting circuit B50 to control the transmitting of Lidar signal.

As partially introduced in FIG. 1, the Lidar signal transmitting circuit B50 may include a laser transmitter B51, a collimating mirror B52, a scanner B53 and the like sequentially arranged on the transmitting light path. The laser transmitter B51 may emit/transmit a Lidar signal, and the collimating mirror B52 may collimate the lidar signal into parallel lidar signal. The galvanometer B53 may deflect the parallel lidar signal and output the parallel laser signal to and scan a target object. Correspondingly, the digital processing circuit B40 may perform ranging of the target position according to the transmitting time of the lidar signal and the reception time of reflected optical signal. The digital processing, circuit B40 may also determine the reflection characteristics of the target object based on the reflected optical signal.

It will be understood by those skilled in the art that the structures shown in the figures in the present application are only block diagrams of partial structures related to the solution of technical problem raised in the present application, and do not constitute limitation to the Lidar for which the solution of the present invention is applied. The Lidar and/or the Lidar signal, receiving circuit in the present application may include more or fewer components than shown, or some components may be combined, or have different component arrangements.

Figure 17:
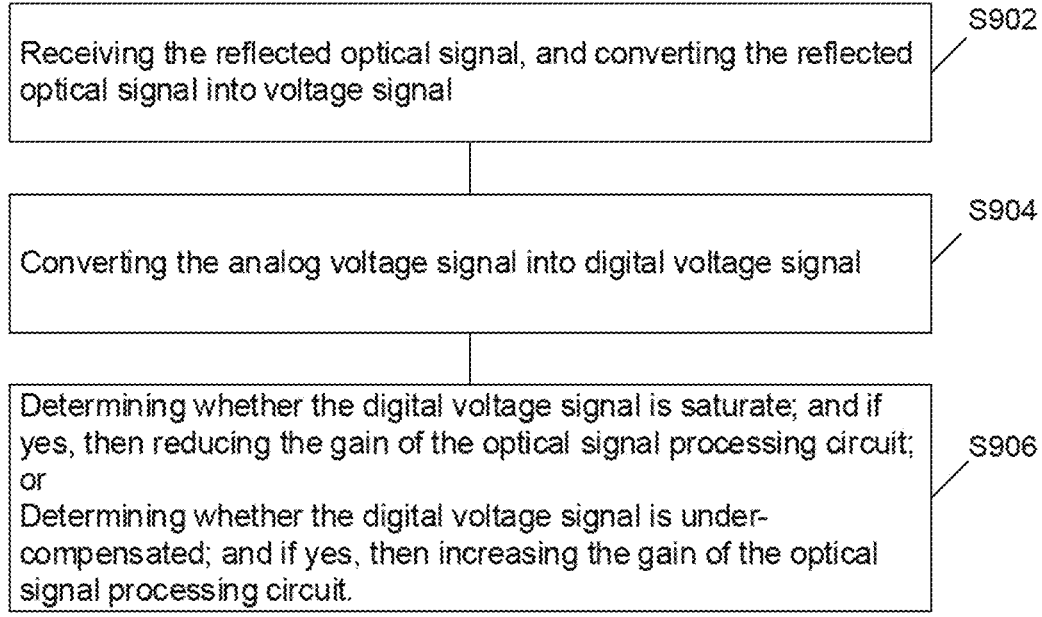
FIG. 17 is a flowchart of a method for controlling the gain of a Lidar n accordance with some of the embodiments of the present application.

FIG. 17 is a flowchart of a method S900 for controlling the gain of a Lidar according to embodiments of the present application. The method may be executed by the above-introduced Lidar or the Lidar signal receiving circuits in the present application. The method may include:

S902, receiving the reflected optical signal, and converting the reflected optical signal into voltage signal. According to embodiments of the present application, the voltage signal may be analog voltage signal or digital voltage signal.

S904, conducting signal conversion to the voltage signal. If the voltage signal is analog, and the processing circuit B40 is a digital processing circuit, then converting the analog voltage signal into digital voltage signal; if the voltage signal is digital and the processing circuit B40 is an analog processing circuit, then converting the digital voltage signal into analog voltage signal.

S908, determining whether the voltage signal is saturate or under compensated, and adjusting the gain of the optical signal processing circuit B10 accordingly. If the voltage signal is saturate, then reducing the gain of the optical signal processing circuit B10. If the voltage signal is under compensation, then increasing the gain of the optical signal processing circuit B10.

It should be noted that the above description of the systems and methods for controlling the gain of a Lidar is provided for the purpose of illustration, and not intended to limit the scope of the present disclosure. For persons having ordinary skills in the art, components of the systems and methods may be combined in various ways, or connected with other components as sub-systems. Various variations and modifications may be conducted under the teaching of the present disclosure. However, those variations and modifications may not depart from the spirit and scope of this disclosure.

Having thus described the basic concepts, it may be rather apparent to those skilled in the art after reading this detailed disclosure, that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "a embodiment" and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein, in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

Furthermore, the recited order of processing/method elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter, requires more features than are expressly recited in each claim. Rather, claimed subject matter may lie in less than all features of a single foregoing disclosed embodiment.

The invention claimed is:

1. An optical signal, processing circuit for Lidar, comprising:
an optical processing circuit to convert a photocurrent signal from an optical sensor to a voltage signal;
a gain control circuit, connecting to the optical processing circuit; and
a controller, connecting to the gain control circuit, to adjust a gain of the optical processing circuit via the gain control circuit and based on an amplitude of the voltage signal.

2. The optical signal processing circuit of claim 1, wherein the optical processing circuit includes an amplification circuit to amplify the photocurrent signal to the voltage signal.

3. The optical signal processing circuit of claim 2, wherein to adjust the gain of the optical processing circuit, the controller determines a target gain of the amplification circuit so that the amplitude of the voltage signal remains substantially stable regardless of an amplitude of the photocurrent signal.

4. The optical signal processing circuit of claim 3, wherein the optical receiver is a laser receiver of a Lidar, and
the photocurrent is generated by the laser receiver from a laser beam transmitted by the Lidar and reflected from a target object, and
to adjust the gain of the optical processing circuit, the controller:
determines a distance between the target object and the laser receiver, and
determines the target gain of the amplification circuit according to the ranging distance to compensate a change of the photocurrent signal due to a change of the distance.

5. The optical signal processing circuit of cl wherein the controller includes a digital processing circuit, and
to adjust the gain of the optical processing circuit, the digital processing circuit:
determines that the voltage signal saturated,
generate a control signal, and
send the control signal to the gain control circuit to decrease the gains of the optical signal processing circuit.

6. The optical signal processing circuit of claim 2, wherein the controller includes a digital processing circuit, and
to adjust the gain of the optical processing circuit, the digital processing circuit:
determines that the voltage signal is under-compensated,
generate a control signal, and
send the control signal to the gain control circuit to increase the gain of the optical signal processing circuit.

7. The optical signal processing circuit of claim 2, wherein the optical processing circuit includes an optical sensor to convert an optical signal to the photocurrent signal, and
the gain control circuit is configured to adjust a bias voltage of the optical sensor.

8. The optical signal processing circuit of claim 2, wherein the amplification circuit includes a transimpedance amplifier, and
the gain control circuit is a resistance-control circuit configured to adjust a resistance of a feedback resistor of the amplification circuit.

9. The optical signal processing circuit of claim 2, wherein the amplification circuit includes a transimpedance amplifier (TIA), which includes a plurality of candidate TIA resistors, and
the gain control circuit includes a switch connecting to the plurality of candidate TIA resistors and configured to switching between the plurality of candidate TIA resistors to select a target resistor from the plurality of candidate TIA resistors.

10. The optical signal processing circuit of claim 2, wherein the optical processing circuit further includes a secondary amplification circuit other than the amplification circuit, and
the gain control circuit further connects to the secondary amplification circuit to adjust a gain of the secondary amplification circuit.

11. A Lidar, comprising:
a laser transmitter to emit a laser beam,
an optical processing circuit to:
receive the laser beam reflected from a target object and convert the reflected laser beam to a photocurrent signal, and
convert the photocurrent signal from an optical receiver to a voltage signal;
a gain control circuit, connecting to the optical processing circuit; and
a controller; connecting to the gain control circuit, to adjust a gain of the optical processing circuit via the gain control circuit and based on an amplitude of the voltage signal.

12. The Lidar of claim 11, wherein the optical processing circuit includes an amplification circuit to amplify the photocurrent signal to the voltage signal.

13. The Lidar of claim 12, wherein to adjust the gain of the optical processing circuit, the controller determines a target gain of the amplification circuit so that the amplitude of the voltage signal remains substantially stable regardless of an amplitude of the photocurrent signal.

14. The Lidar of claim 13, wherein to adjust, the gain of the optical processing circuit, the controller:
determines a distance between the target object and the laser receiver, and
determines the target gain of the amplification circuit according to the ranging distance to compensate a change of the photocurrent signal due to a change of the distance.

15. The Lidar of claim 12, wherein the controller includes a digital processing circuit, and
to adjust the gain of the optical processing circuit, the digital processing circuit:
determines that the voltage sigma is saturated,
generate a control signal, and
send the control signal to the gain control circuit to decrease the gain of the optical signal processing circuit.

16. The Lidar of claim 12, wherein the controller includes a digital processing circuit, and
to adjust the gain of the optical processing circuit, the digital processing circuit:
determines that the voltage signal is under-compensated,
generate a control signal, and
send the control signal to the gain control circuit to increase the gain of the optical signal processing circuit.

17. The Lidar of claim 12, wherein the optical processing circuit includes an optical sensor to convert an optical signal to the photocurrent signal, and
the gain control circuit is configured to adjust a bias voltage of the optical sensor.

18. The Lidar of claim 12, wherein the amplification circuit includes a transimpedance amplifier, and
the gain control circuit is a resistance-control circuit configured to adjust a resistance of a feedback resistor of the amplification circuit.

19. The Lidar of claim 12, wherein the amplification circuit includes a transimpedance amplifier (TIA), which includes a plurality of candidate TIA resistors, and the gain control circuit includes a switch connecting to the plurality of candidate TIA resistors and configured to switching between the plurality of candidate TIA resistors to select a target resistor from the plurality of candidate TIA resistors.

20. The Lidar of claim 12, wherein the optical processing circuit further includes a secondary amplification circuit other than the amplification circuit, and the gain control circuit further connects to the secondary amplification circuit to adjust a gain of the secondary amplification circuit.

* * * * *